(12) United States Patent
Khulusi

(10) Patent No.: US 7,479,012 B1
(45) Date of Patent: Jan. 20, 2009

(54) METHOD FOR PRODUCING POLYHEDRAL NETS

(75) Inventor: Basimah Khulusi, Kansas City, MO (US)

(73) Assignee: Basimah Khulusi MD, LLC, Kansas City, MO (US)

(*) Notice: Subject to any disclaimer, the term of this patent is extended or adjusted under 35 U.S.C. 154(b) by 347 days.

(21) Appl. No.: 11/283,636

(22) Filed: Nov. 21, 2005

Related U.S. Application Data

(60) Provisional application No. 60/629,992, filed on Nov. 22, 2004, provisional application No. 60/632,558, filed on Dec. 2, 2004, provisional application No. 60/635,878, filed on Dec. 14, 2004.

(51) Int. Cl.
*G09B 23/02* (2006.01)

(52) U.S. Cl. .................................... 434/188

(58) Field of Classification Search .............. 434/81, 434/82, 85, 135, 188, 211, 215, 216, 276, 434/300; 345/420
See application file for complete search history.

(56) References Cited

U.S. PATENT DOCUMENTS

| 185,889 | A | | 1/1877 | Boorman |
|---|---|---|---|---|
| 1,050,596 | A | | 1/1913 | Bacon |
| 1,081,207 | A | | 12/1913 | Cahill |
| 2,393,676 | A | * | 1/1946 | Fuller .......................... 434/135 |
| 5,838,332 | A | * | 11/1998 | Penna et al. ................ 345/587 |
| 6,556,198 | B1 | * | 4/2003 | Nishikawa .................. 345/420 |
| 6,816,819 | B1 | * | 11/2004 | Loveland ....................... 703/1 |
| 6,867,772 | B2 | * | 3/2005 | Kotcheff et al. ............. 345/420 |
| 6,952,204 | B2 | * | 10/2005 | Baumberg et al. .......... 345/420 |

OTHER PUBLICATIONS

"PolyMod Polyhedron Modeler", Apr. 28, 2001 [retrieved online Mar. 19, 2008].*
Haben, Nils, "Elastic Surface Nets—Three-Dimensional Reconstruction of Medical Imaging Data," Surgical Systems Laboratory Research Center, pp. 1-81, 2001.
Liu, Wei-zhong, et al.; "An Adaptive Algorithm of Automatic Implementing Fillet Operations With Loop Subdivision Surfces," Proceedings of SPIE, vol. 4756, pp. 87-97, 2003.
Sun, Julie, "Folding Orthogonal Polyhedra," A Thesis Presented to the University of Waterloo, Waterloo, Ontario, Canada, pp. 1-44, 1999.

* cited by examiner

*Primary Examiner*—Kurt Fernstrom
(74) *Attorney, Agent, or Firm*—Lathrop & Gage, LC

(57) ABSTRACT

Methods are provided for producing a plurality of polyhedral nets, creating polyhedrons from the polyhedral nets, and teaching lessons related to math, science, or art using the polyhedral nets and polyhedrons. In one embodiment, the polyhedral nets and polyhedrons correspond to a three dimensional polyhedra seen in Melencolia I by Albrecht Dürer.

10 Claims, 14 Drawing Sheets

METHOD FOR PRODUCING POLYHEDRAL NETS

RELATED APPLICATIONS

This application claims priority to U.S. Patent Application Ser. No. 60/629,992, filed Nov. 22, 2004; U.S. Patent Application Ser. No. 60/632,558, filed Dec. 2, 2004; and U.S. Patent Application Ser. No. 60/635,878, filed Dec. 14, 2004. The disclosures of which are incorporated herein by reference.

BACKGROUND

Polyhedral nets are flat compositions of polygons capable of being cut and folded along prescribed lines and joined at their edges to form polyhedral solids. A polyhedral net shows both an outline of the polyhedral and fold lines for the polyhedral.

It is generally agreed that *Underweysung der Messung* by Albrecht Dürer (1471-1528) presents the earliest known examples of polyhedral nets. This was clearly an extension of the renaissance idea that polyhedra are models worthy of an artist's attention, and the two-dimensional representation of polyhedra was seen as one of the main problems of perspective geometry in Dürer's time. Further, Dürer produced an engraving, Melencolia I, in 1514 that includes an uncommon polyhedron which has since been the topic of serious discussion, mathematical interest, and various reconstruction attempts.

Erwin Panofsky, a German-American art historian and essayist, described Dürer's polyhedron as a "truncated rhomboid". According to Panofsky, the polyhedron is simply a cube or rhombohedron which has been truncated at the upper vertex and possibly the lower vertex. If the polyhedron is not truncated at the lower vertex, the polyhedron penetrates the earth. Most researchers, however, have concluded that Dürer's polyhedron is a six-sided solid with each side shaped as a rhombus, and that the solid has been truncated so that it can be circumscribed in a sphere. Nevertheless, disagreements remain over the polyhedron and any possible meaning that it may convey, and a method of creating a polyhedral net corresponding to Dürer's polyhedron has heretofore been absent.

Later, polyhedral nets were commonly used in cartography to resolve the earth's surface into a polyhedron. Examples of this can be found in patents to J. M. Boorman (U.S. Pat. No. 185,889), G. W. Bacon (U.S. Pat. No. 1,050,596), B. J. S. Cahill (U.S. Pat. No. 1,081,207), and Buckminster Fuller (U.S. Pat. No. 2,393,676).

Constructing polyhedral nets requires precise computing, measuring, drawing, cutting, and constructing. As such, polyhedral nets may be used in teaching lessons related to math (especially algebra and geometry) and art. Polyhedra constructed from polyhedral nets are also known to have interesting strength characteristics (they can often carry loads many times larger than their own weight,) and may also be used in teaching lessons related to physics.

Through history, polyhedra have been closely associated with the world of art. The peak of this relationship was certainly in the Renaissance. For some Renaissance artists, polyhedra simply provided challenging models to demonstrate their mastery of perspective. For others, polyhedra were symbolic of deep religious or philosophical truths. For example, Plato's association in the Timaeus between the Platonic solids and the elements of fire, earth, air, and water (and the universe) was of great import in the Renaissance. This was tied to the mastery of geometry necessary for perspective, and suggested a mathematical foundation for rationalizing artistry and understanding sight, just as renaissance science explored mathematical and visual foundations for understanding the physical world, astronomy, and anatomy. For other artists, polyhedra simply provide inspiration and a storehouse of forms with various symmetries from which to draw on.

Also, geometry as art seems the most natural approach for teaching this subject, just as at the times of Dürer when he believed that:

. . . . Since geometry is the right foundation of all painting, I have decided to teach its rudiments and principles to all youngsters eager for art . . . . Course in the Art of Measurement Norman Shapiro, M. A., who is a teacher and an artist with more than thirty years of teaching experience, with art works in many collections: The Museum of Modern Art, the archives of several universities (Idaho State at Boise, Indiana State at Bloomington), and in many private collections, says: The best way for children to learn about geometry is to take up pencil and straight edge (a ruler will do) and design geometrically on paper. Children need to feel about geometry the way the Egyptians did. Children learn best when they too see geometry as a means to an end. Children are artists at heart. The rationale of making something geometry into art doesn't need explanation. To children, beauty comes before logic and theories; therefore, Geometry Through Art can provide the means.

The relationship between geometry and art appears in different ways: proportion, perspective, symmetry, abstraction and symbolic subject matter. Mathematics is not just about formulas and logic, but also about patterns, symmetry, structure, shape and beauty. Courses are given to study connections between mathematics and art and architecture, study topics like tilings, polyhedra and perspective.

Also, it might help in popularizing Mathematics, in raising public awareness of mathematics effectively. It will help scientists identify shapes in nature, for example: the complex arrangements of macromolecules in the virus shell are minute marvels of molecular architecture. Specific requirements of each type of virus have resulted in a fascinating apparent diversity of organization and geometrical design.

It will help the art scholars be able to decipher the message hidden in Melencolia I, and understand the meaning that Dürer meant to convey. Art Scholars have wondered whether "the possibility arises that the odd-shaped block and its magic square are not just two iconographical elements, amongst many others in the engraving, but perhaps even the Raison D'être of the whole work".

SUMMARY

Methods are disclosed herein for producing a plurality of polyhedral nets, creating polyhedrons from the polyhedral nets, and teaching lessons related to math, science, or art using the polyhedral nets and polyhedrons. In one embodiment, the polyhedral nets and polyhedrons correspond to a three dimensional polyhedron seen in Melencolia I by Albrecht Dürer.

DETAILED DESCRIPTION

An exemplary three dimensional polyhedra (100) produced according to one embodiment may be constructed as follows. A flat piece of foldable material (110) may be provided. An orthogonal coordinate system having a horizontal axis denoted ($\alpha$), a vertical axis denoted ($\beta$), and an origin denoted (1) may then be defined on the material (110). The coordinate system may or may not be a typical Cartesian coordinate system with values increasing upwardly and to the right. Values greater than zero may then be selected for a distance (X) and a constant (Y). A value between (but not including) zero and one hundred and eighty degrees may be selected for an angle (D).

Figure 1A:
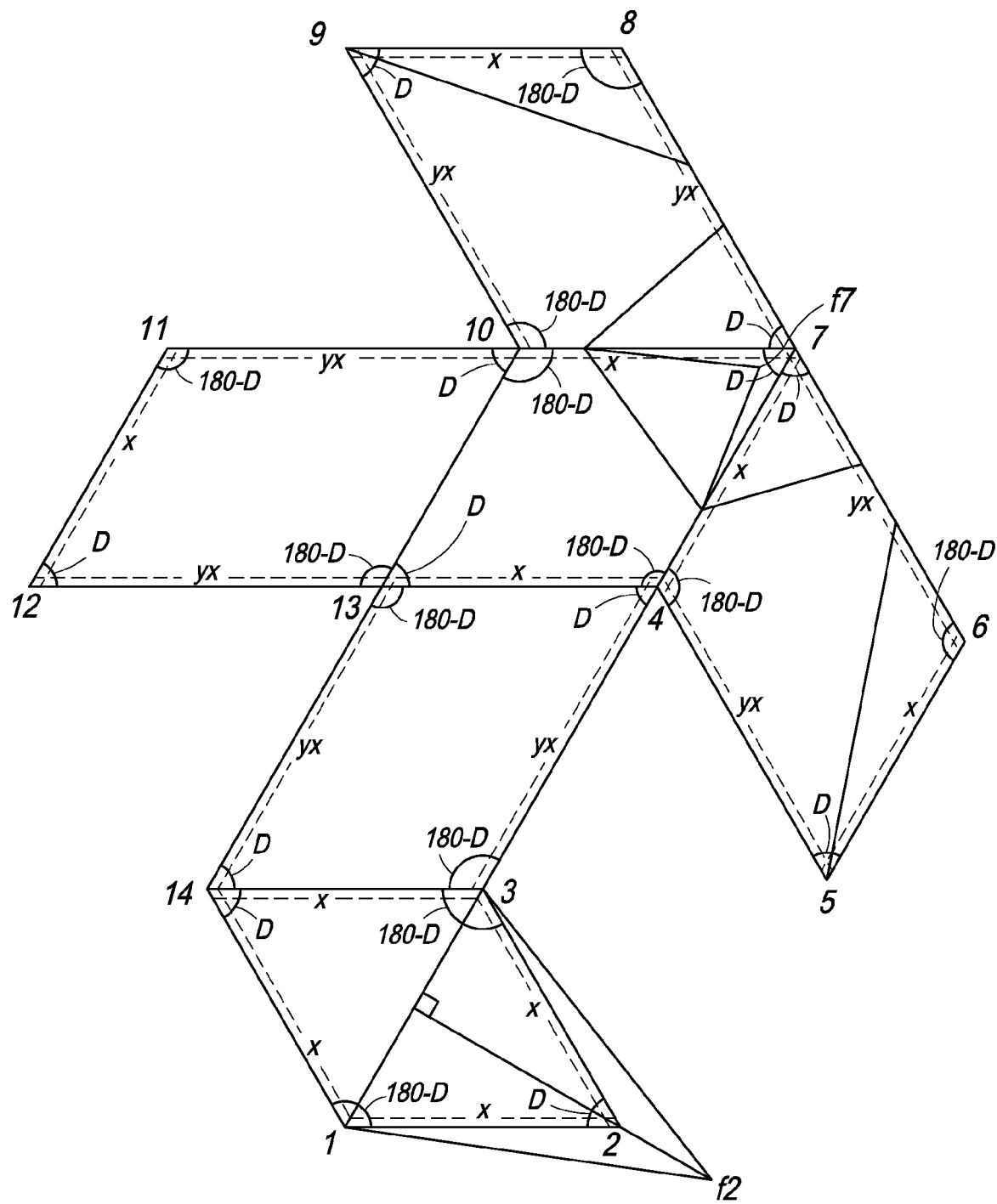
FIG. 1*a* shows a polyhedral net according to an embodiment with various details omitted.
Figure 1B:
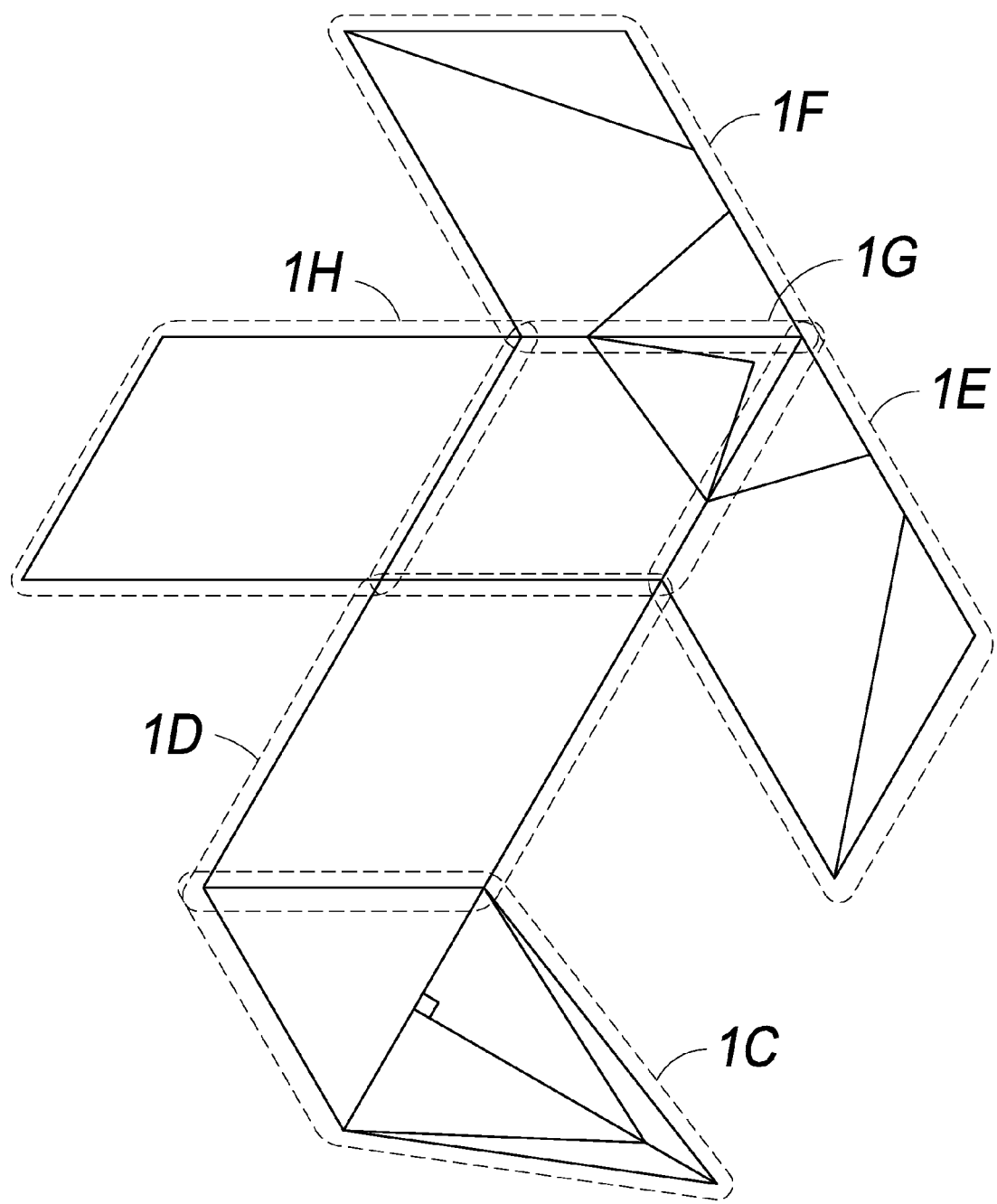
FIG. 1*b* shows the polyhedral net of FIG. 1*a* with sectional views labeled.
Figure 1C:
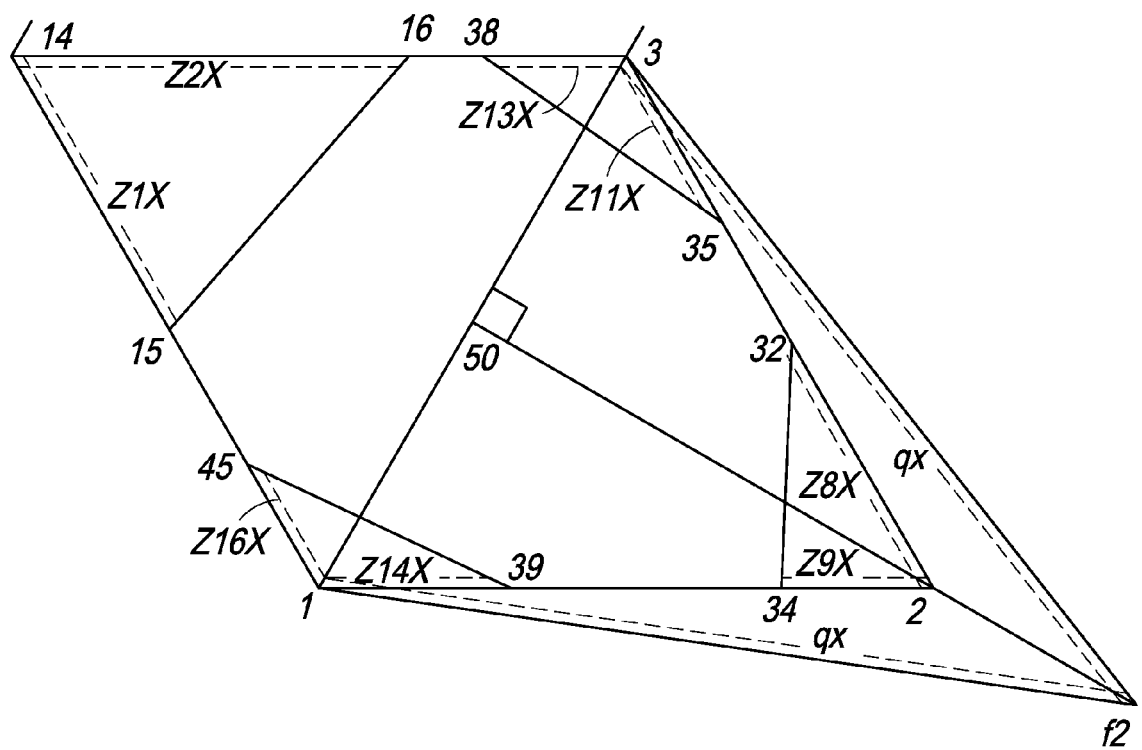
FIGS. 1c through 1h show different sections of the polyhedral net of FIG. 1a in detail.
Figure 1D:
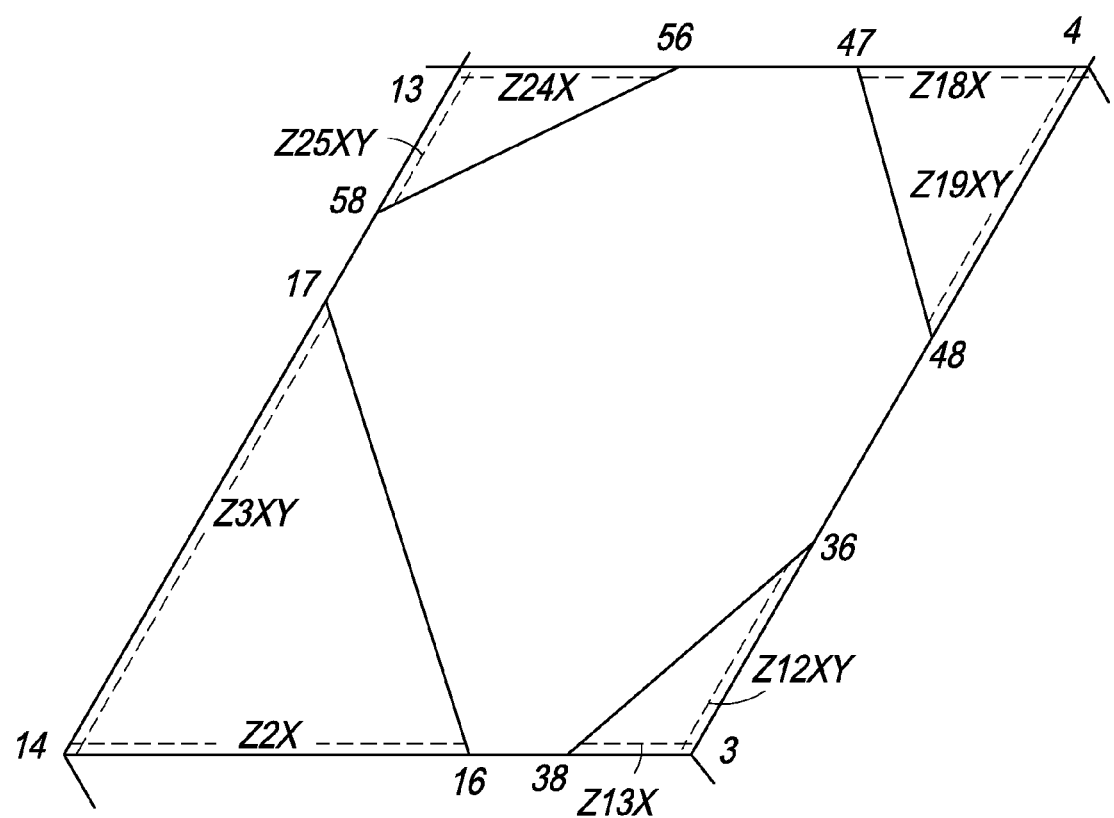
Figure 1E:
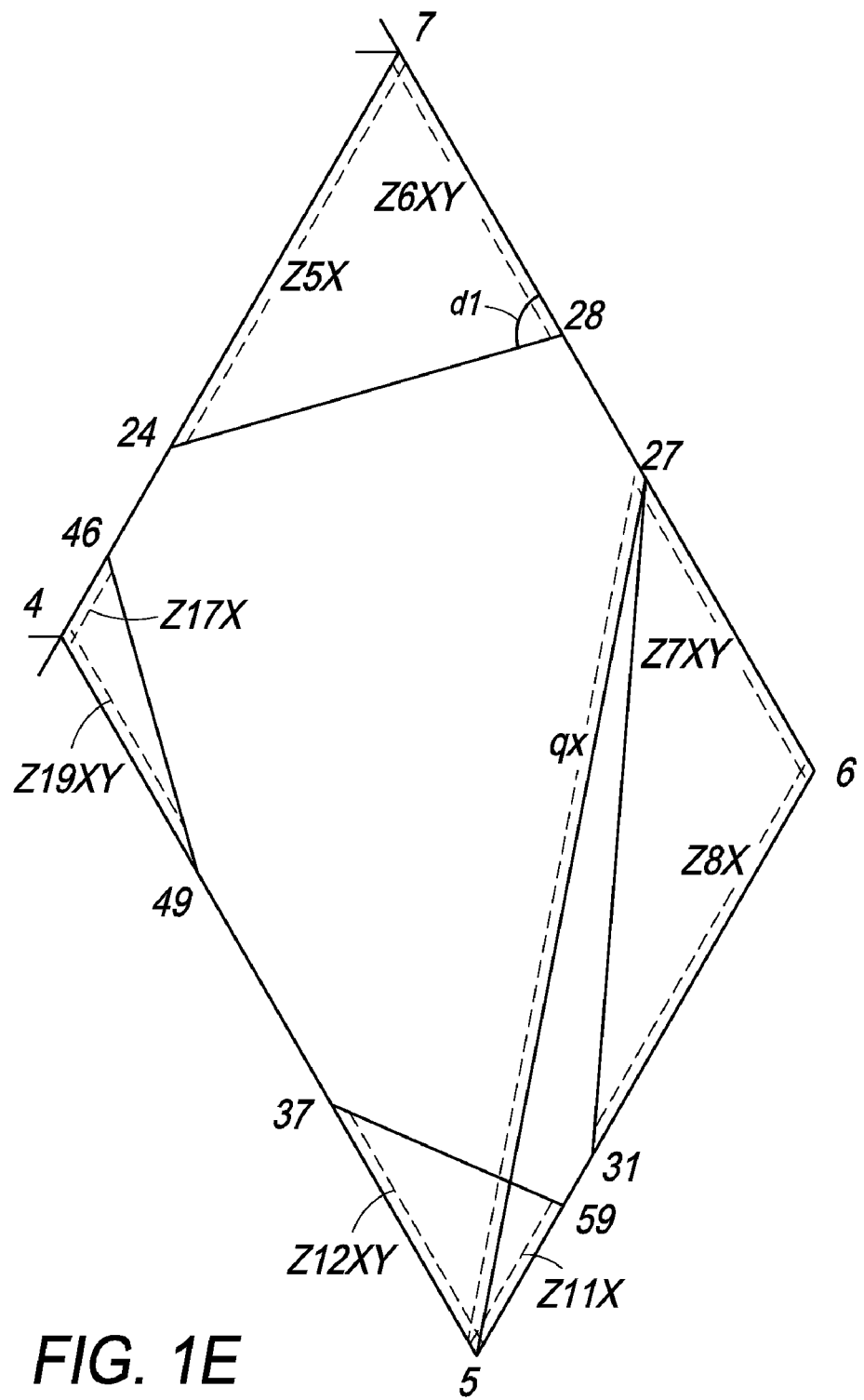
Figure 1F:
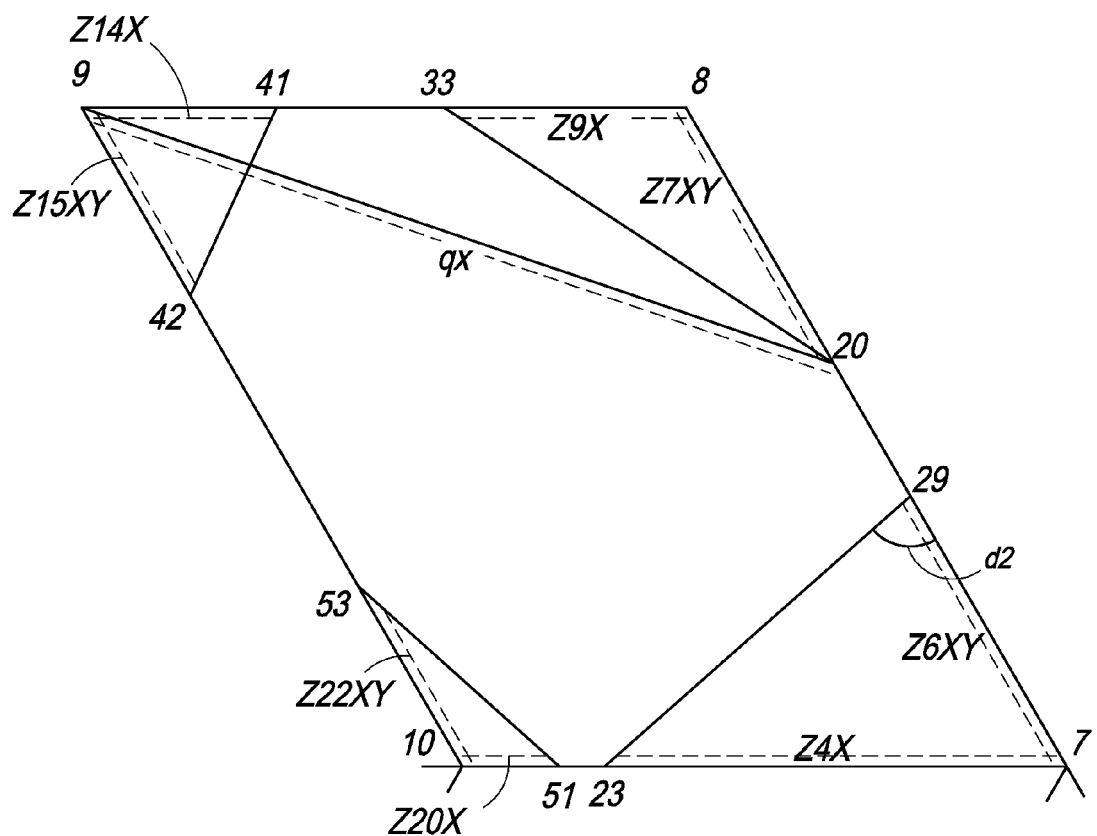
Figure 1G:
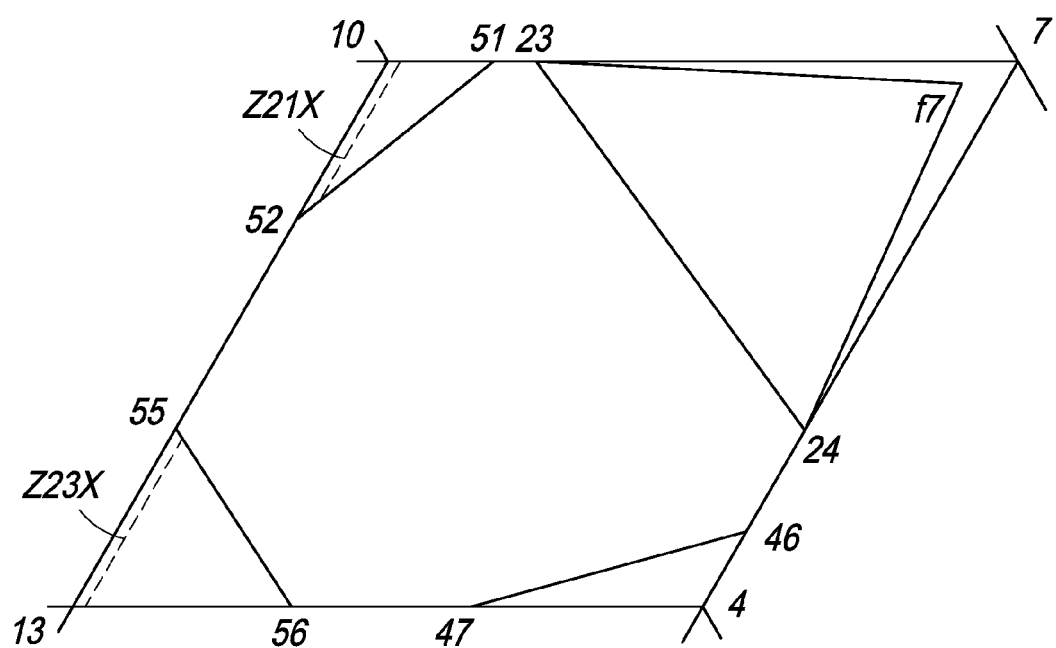
Figure 1H:
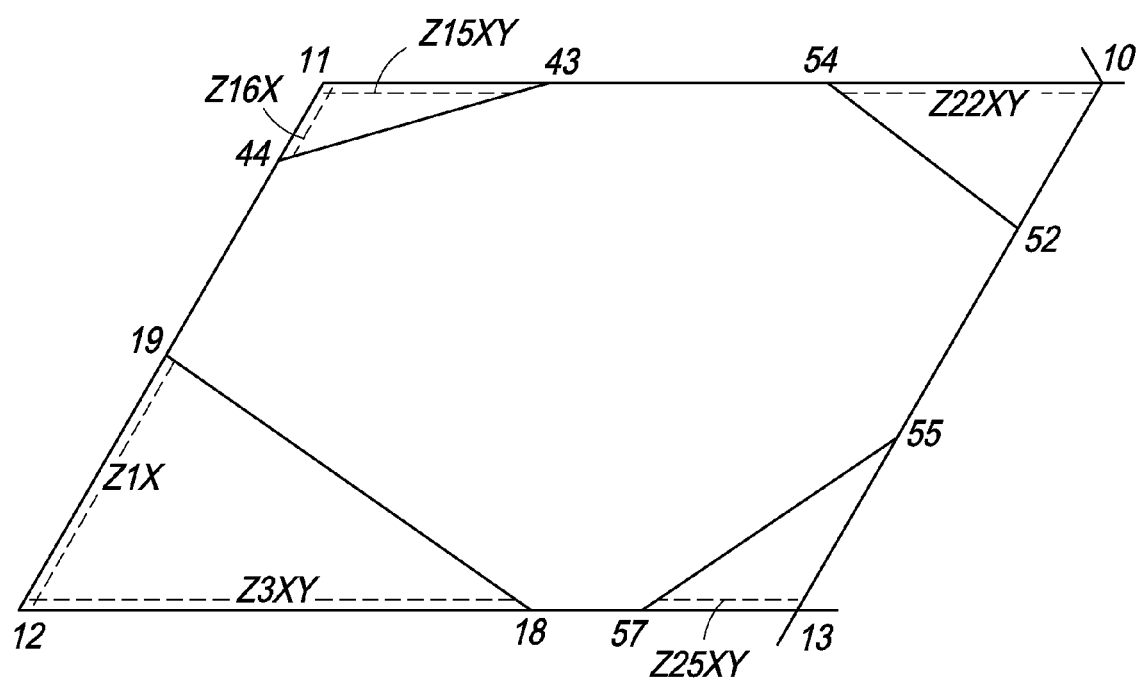
Figure 2:
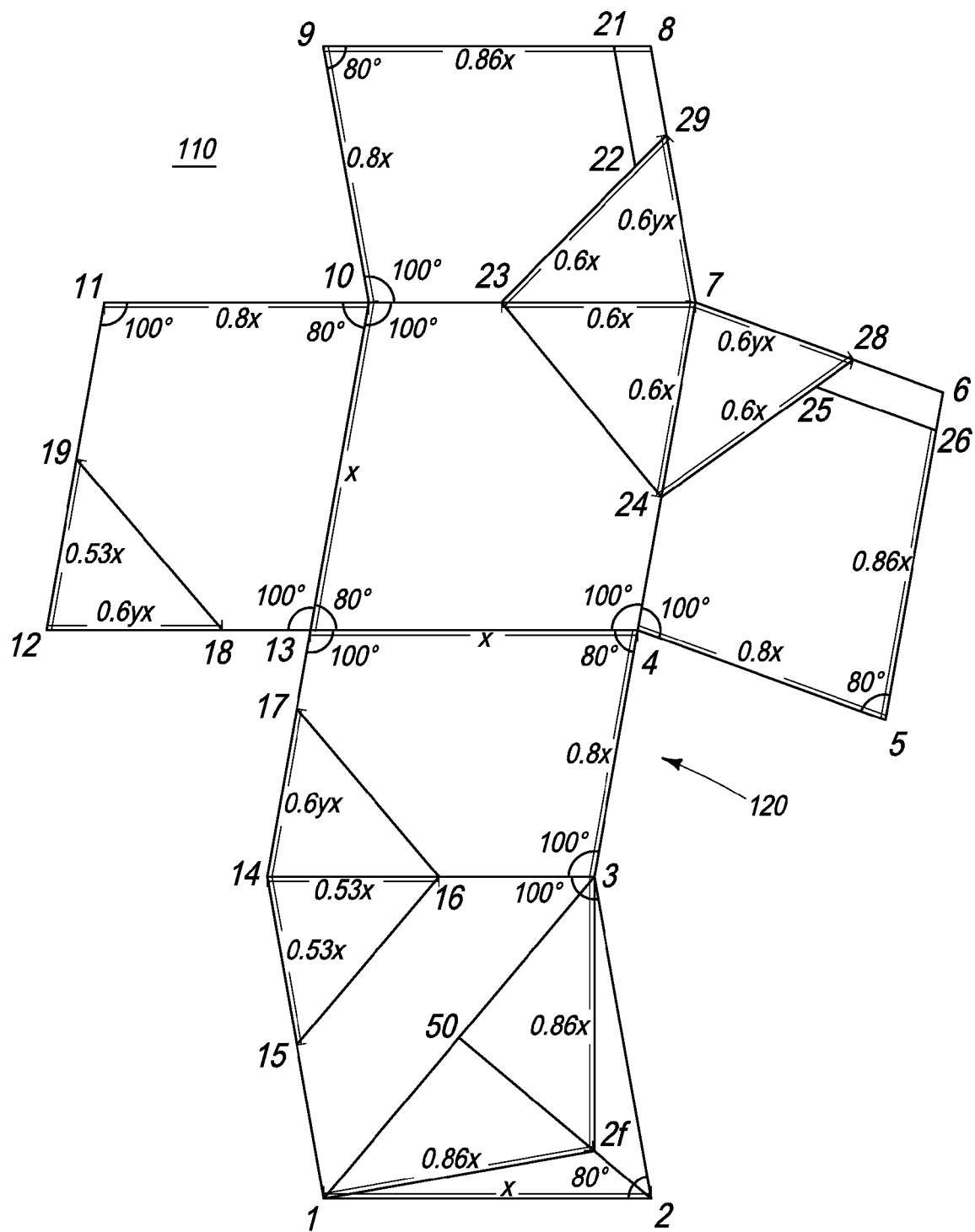
FIG. 2 shows a polyhedral net according to an embodiment, the polyhedral net having a value of D=80 degrees and Y=0.8.

As shown in FIGS. 1a through 2, a line may then be drawn along the horizontal axis ($\alpha$) from the origin (1) to a new point (2) that is the distance (X) from the origin (1), whereby forming a line (1)-(2). The line may then be continued from the point (2) at an angle of (180–D) degrees from ($\alpha$) to a new point (3) that is the distance (X) from the point (2), whereby forming a line (2)-(3). The line may then be continued from the point (3) at the angle of (D) degrees from ($\alpha$) to a new point (4) that is the distance (X)(Y) from the point (3), whereby forming a line (3)-(4). It should be clear that the distance (X)(Y) is equal to the distance (X) multiplied by the constant (Y), and (X)(Y) may be denoted herein as (XY). The line may then be continued from the point (4) at an angle of (–[180–2D]) degrees from ($\alpha$) to new point (5) that is the distance (XY) from the point (4), whereby forming a line (4)-(5). The line may then be continued from the point (5) at the angle of (D) degrees from ($\alpha$) to a new point (6) that is the distance (X) from the point (5), whereby forming a line (5)-(6). The line may then be continued from the point (6) at an angle of (2D) degrees from ($\alpha$) a new point (7) that is the distance (XY) from the point (6), whereby forming a line (6)-(7). The line may then be continued from the point (7) at an angle of (180–D) degrees from ($\alpha$) to a new point (8) that is the distance (XY) from the point (7), whereby forming a line (7)-(8). The line may then be continued from the point (8) at an angle of 180 degrees from ($\alpha$) to a new point (9) that is the distance (X) from the point (8), whereby forming a line (8)-(9). The line may then be continued from the point (9) at an angle of (–D) degrees from ($\alpha$) to a new point (10) that is the distance (XY) from the point (9), whereby forming a line (9)-(10). The line may then be continued from the point (10) at an angle of 180 degrees from ($\alpha$) to a new point (11) that is the distance (XY) from the point (10), whereby forming a line (10)-(11). The line may then be continued from the point (11) at an angle of (–[180–D]) degrees from ($\alpha$) to a new point (12) that is the distance (X) from the point (11), whereby forming a line (11)-(12). The line may then be continued from the point (12) at an angle of zero degrees from ($\alpha$) to a new point (13) that is the distance (XY) from the point (12), whereby forming a line (12)-(13). In other words, the line (12)-(13) is parallel to ($\alpha$). The line may then be continued from the point (13) at an angle of (–[180–D]) degrees from ($\alpha$) to a new point (14) that is the distance (XY) from the point (13), whereby forming a line (13)-(14). The line may then be continued from the point (14) at an angle of (–D) degrees from ($\alpha$) to the origin (1) that is the distance (X) from the point (14), whereby forming a line (14)-(1).

The point (14) may then be connected to the point (3) with indicia (i.e., ink, graphite, etc.), forming a fold line (3)-(14). The point (13) may then be connected to the point (4) with indicia, forming a fold line (4)-(13). The point (13) may then be connected to the point (10), forming a fold line (10)-(13). The point (10) may then be connected to the point (7), forming a fold line (7)-(10). The point (4) may then be connected to the point (7), forming a fold line (4)-(7).

A polyhedron net (120) constructed of the foldable material (110) may then be separated from excess foldable material (110) by cutting along the following lines: (1)-(2), (2)-(3), (3)-(4), (4)-(5), (5)-(6), (6)-(7), (7)-(8), (8)-(9), (9)-(10), (10)-(11), (11)-(12), (12)-(13), (13)-(14), and (14)-(1).

To begin to form a three dimensional polyhedron from the polyhedron net, the polyhedron net may be folded along the fold lines (3)-(14), (4)-(13), (10)-(13), (7)-(10), and (4)-(7) with all of the fold lines being located on an exterior surface of the polyhedron.

The line (7)-(8) may be secured to the line (7)-(6), forming a polyhedral edge ((7)-(8))-((6)-(7)). The line (9)-(10) may then be secured to the line (10)-(11), forming a polyhedral edge ((9)-(10))-((10)-(11)). The line (4)-(5) may be secured to the line (3)-(4), forming a polyhedral edge ((4)-(5))-((3)-(4)). Then the line (12)-(13) may be secured to the line (13)-(14), forming a polyhedral edge ((12)-(13))-((13)-(14)). The line (2)-(3) may be secured to the line (5)-(6), forming a polyhedral edge ((2)-(3))-((5)-(6)). The line (1)-(2) may be secured to the line (8)-(9), forming a polyhedral edge ((1)-(2))-((8)-(9)). The line (1)-(14) may then be secured to the line (11)-(12), forming a polyhedral edge ((1)-(14))-((11)-(12)). An adhesive tape or another common fastener may be used to secure together the above-noted lines. Once all of the above steps are completed, the three dimensional polyhedra (100) is produced.

A net (120) for an exemplary truncated polyhedron (100) may be produced according to another embodiment as follows. Another flat piece of foldable material (110) may be provided, and an orthogonal coordinate system having the horizontal axis denoted (a), the vertical axis denoted ($\beta$), and the origin denoted (1) may be defined on the material (110). Values greater than zero may again be selected for the distance (X) and the constant (Y). A value between zero and one hundred and eighty degrees may again be selected for an angle (D).

Values equal to or greater than zero and equal to or less than one may then be selected for the truncating constants ($Z_1$), ($Z_2$), ($Z_3$), ($Z_4$), ($Z_5$), ($Z_6$), ($Z_7$), ($Z_8$), ($Z_9$), ($Z_{11}$), ($Z_{12}$), ($Z_{13}$), ($Z_{14}$), ($Z_{15}$), ($Z_{16}$), ($Z_{17}$), ($Z_{18}$), ($Z_{19}$), ($Z_{20}$), ($Z_{21}$), ($Z_{22}$), ($Z_{23}$), ($Z_{24}$), and ($Z_{25}$). The value for the truncating constant ($Z_7$) is less than or equal to the difference between one and the truncating constant ($Z_6$). The value for the truncating constant ($Z_{11}$) is less than or equal to the difference between one and the truncating constant ($Z_8$). The value for the truncating constant ($Z_{13}$) is less than or equal to the difference between one and the truncating constant ($Z_2$). The value for the truncating constant ($Z_{14}$) is less than or equal to the difference between one and the truncating constant ($Z_9$). The value for the truncating constant ($Z_{16}$) is less than or equal to the difference between one and the truncating constant ($Z_1$). The value for the truncating constant ($Z_{17}$) is less than or equal to the difference between one and the truncating constant ($Z_5$). The value for the truncating constant ($Z_{19}$) is less than or equal to the difference between one and the truncating constant ($Z_{12}$). The value for the truncating constant ($Z_{20}$) is less than or equal to the difference between one and the truncating constant ($Z_4$). The value for the truncating constant ($Z_{22}$) is less than or equal to the difference between one and the truncating constant ($Z_{15}$). The value for the truncating constant ($Z_{23}$) is less than or equal to the difference between one and the truncating constant ($Z_{21}$). The value for the truncating constant ($Z_{24}$) is less than or equal to the difference between one and the truncating constant ($Z_{18}$). The value for the truncating constant ($Z_{25}$) is less than or equal to the difference between one and the truncating constant ($Z_3$).

A line may then be drawn along the horizontal axis (a) from the origin (1) to a new point (2) that is the distance (X) from the origin (1), whereby forming a line (1)-(2). The line may then be continued from the point (2) at an angle of (180–D) degrees from ($\alpha$) to a new point (3) that is the distance (X) from the point (2), whereby forming a line (2)-(3). The line may be continued from the point (3) at the angle of (D) degrees from ($\alpha$) to a new point (4) that is the distance (X)(Y) from the point (3), whereby forming a line (3)-(4). It should be clear that the distance (X)(Y) is equal to the distance (X) multiplied by the constant (Y), and (X)(Y) may be denoted herein as (XY). The line may then be continued from the point (4) at an angle of (–[180–2D]) degrees from ($\alpha$) to new point (5) that is the distance (XY) from the point (4), whereby forming a line (4)-(5). The line may then be continued from the point (5) at the angle of (D) degrees from ($\alpha$) to a new point (6) that is the distance (X) from the point (5), whereby forming a line (5)-(6). The line may then be continued from the point (6) at an angle of (2D) degrees from ($\alpha$) a new point (7) that is the distance (XY) from the point (6), whereby forming a line (6)-(7). The line may then be continued from the point (7) at an angle of (180–D) degrees from ($\alpha$) to a new point (8) that is the distance (XY) from the point (7), whereby forming a line (7)-(8). The line may then be continued from the point (8) at an angle of 180 degrees from ($\alpha$) to a new point (9) that is the distance (X) from the point (8), whereby forming a line (8)-(9). The line may then be continued from the point (9) at an angle of (–D) degrees from ($\alpha$) to a new point (10) that is the distance (XY) from the point (9), whereby forming a line (9)-(10). The line may then be continued from the point (10) at an angle of 180 degrees from ($\alpha$) to a new point (11) that is the distance (XY) from the point (10), whereby forming a line (10)-(11). The line may then be continued from the point (11) at an angle of (–[180–D]) degrees from ($\alpha$) to a new point (12) that is the distance (X) from the point (11), whereby forming a line (11)-(12). The line may then be continued from the point (12) at an angle of zero degrees from ($\alpha$) to a new point (13) that is the distance (XY) from the point (12), whereby forming a line (12)-(13). In other words, the line (12)-(13) is parallel to (a). The line may then be continued from the point (13) at an angle of (–[180–D]) degrees from ($\alpha$) to a new point (14) that is the distance (XY) from the point (13), whereby forming a line (13)-(14). The line may be continued from the point (14) at an angle of (–D) degrees from ($\alpha$) to the origin (1) that is the distance (X) from the point (14), whereby forming a line (14)-(1).

The point (14) may then be connected to the point (3) with indicia (i.e., ink, graphite, etc.), forming a fold line (3)-(14). The point (13) may then be connected to the point (4) with indicia, forming a fold line (4)-(13). The point (13) may then be connected to the point (10), forming a fold line (10)-(13). The point (10) may then be connected to the point (7), forming a fold line (7)-(10). The point (4) may then be connected to the point (7), forming a fold line (4)-(7).

A point (15) may then be marked along the line (14)-(1) at a distance ($Z_1$) multiplied by (X), also denoted as ($Z_1$X), from the point (14). A point (19) may then be marked along the line (11)-(12) at the distance ($Z_1$X), from the point (12). A point (16) may then be marked along the fold line (3)-(14) at a distance ($Z_2$) multiplied by (X), also denoted as ($Z_2$X), from the point (14). A point (17) may then be marked along the line (13)-(14) at a distance ($Z_3$) multiplied by (X) multiplied by (Y), also denoted as ($Z_3$XY), from the point (14). A point (18) may then be marked along the line (12)-(13) at the distance ($Z_3$XY) from the point (12). A point (23) may then be marked along the fold line (7)-(10) at a distance ($Z_4$) multiplied by (X), also denoted as ($Z_4$X), from the point (7). A point (24) may then be marked along the fold line (4)-(7) at a distance ($Z_5$) multiplied by (X), also denoted as ($Z_5$X), from the point (7). A point (28) may then be marked along the line (6)-(7) at a distance ($Z_6$) multiplied by (X) multiplied by (Y), also denoted as ($Z_6$XY), from the point (7). A point (29) may then be marked along the line (7)-(8) at the distance ($Z_6$XY) from the point (7). A point (27) may then be marked along the line (6)-(7) at a distance ($Z_7$) multiplied by (X) multiplied by (Y), also denoted as ($Z_7$XY), from the point (6). A point (20) may then be marked along the line (7)-(8) at the distance ($Z_7$XY) from the point (8). A point (31) may then be marked along the line (5)-(6) at a distance ($Z_8$) multiplied by (X), also denoted as ($Z_8$X), from the point (6). A point (32) may then be marked along the line (2)-(3) at the distance ($Z_8$X) from the point (2). A point (33) may then be marked along the line (8)-(9) at a distance ($Z_9$) multiplied by (X), also denoted as ($Z_9$X), from the point (8). A point (34) may then be marked along the line (1)-(2) at the distance ($Z_9$X) from the point (2). A point (59) may then be marked along the line (5)-(6) at a distance ($Z_{11}$) multiplied by (X), also denoted as ($Z_{11}$X), from the point (5). A point (35) may then be marked along the line (2)-(3) at the distance ($Z_{11}$X) from the point (3). A point (36) may then be marked along the line (3)-(4) at a distance ($Z_{12}$) multiplied by (X) multiplied by (Y), also denoted as ($Z_{12}$XY), from the point (3). A point (37) may then be marked along the line (4)-(5) at the distance ($Z_{12}$XY) from the point (5). A point (38) may then be marked along the fold line (3)-(14) at a distance ($Z_{13}$) multiplied by (X), also denoted as ($Z_{13}$X), from the point (3). A point (39) may then be marked along the line (1)-(2) at the at a distance ($Z_{14}$) multiplied by (X), also denoted as ($Z_{14}$X) from the point (1). A point (41) may then be marked along the line (8)-(9) at the distance ($Z_{14}$X) from the point (9). A point (42) may then be marked along the fold line (9)-(10) at a distance ($Z_{15}$) multiplied by (X) multiplied by (Y), also denoted as ($Z_{15}$XY), from the point (9). A point (43) may then be marked along the line (10)-(11) at the at a distance ($Z_{15}$) multiplied by (X) multiplied by (Y), also denoted as ($Z_{15}$XY) from the point (11). A point (44) may then be marked along the line (11)-(12) at a distance ($Z_{16}$) multiplied by (X), also denoted as ($Z_{16}$X), from the point (11). A point (45) may then be marked along the line (14)-(1) at the distance ($Z_{16}$X) from the point (1). A point (46) may then be marked along the fold line (4)-(7) at a distance ($Z_{17}$) multiplied by (X), also denoted as ($Z_{17}$X), from the point (4). A point (47) may then be marked along the fold line (4)-(13) at a distance ($Z_{17}$) multiplied by (X), also denoted as ($Z_{17}$X)

from the point (4). A point (48) may then be marked along the line (3)-(4) at a distance ($Z_{19}$) multiplied by (X) multiplied by (Y), also denoted as ($Z_{19}$XY), from the point (4). A point (49) may then be marked along the line (4)-(5) at the distance ($Z_{19}$XY) from the point (4). A point (51) may then be marked along the fold line (7)-(10) at a distance ($Z_{20}$) multiplied by (X), also denoted as ($Z_{20}$X), from the point (10). A point (52) may then be marked along the fold line (10)-(13) at a distance ($Z_{21}$) multiplied by (X), also denoted as ($Z_{21}$X) from the point (10). A point (53) may then be marked along the line (9)-(10) at a distance ($Z_{22}$) multiplied by (X) multiplied by (Y), also denoted as ($Z_{22}$XY), from the point (10). A point (54) may then be marked along the line (10)-(11) at the distance ($Z_{22}$XY) from the point (10). A point (55) may then be marked along the fold line (10)-(13) at a distance ($Z_{23}$) multiplied by (X), also denoted as ($Z_{23}$X), from the point (13). A point (56) may then be marked along the fold line (4)-(13) at a distance ($Z_{24}$) multiplied by (X), also denoted as ($Z_{24}$X), from the point (13). A point (57) may then be marked along the line (12)-(13) at a distance ($Z_{25}$) multiplied by (X) multiplied by (Y), also denoted as ($Z_{25}$XY) from the point (13). A point (58) may then be marked along the line (13)-(14) at the distance ($Z_{25}$XY) from the point (13).

The point (15) may then be connected to the point (16) with indicia (i.e., ink, graphite, etc.), forming a fold line (15)-(16) and a triangle (14)-(15)-(16). The point (16) may then be connected to the point (17) with indicia, forming a fold line (16)-(17) and a triangle (14)-(16)-(17). The point (56) may then be connected to the point (58), forming a fold line (56)-(58) and a triangle (13)-(56)-(58). The point (55) may then be connected to the point (56), forming a fold line (55)-(56) and a triangle (13)-(55)-(56).

The point (55) may then be connected to the point (57), whereby forming a fold line (55)-(57) and a triangle (13)-(55)-(57). The point (18) may then be connected to the point (19), whereby forming a fold line (18)-(19) and a triangle (12)-(18)-(19). The point (43) may then be connected to the point (44), whereby forming a fold line (43)-(44) and a triangle (11)-(43)-(44). The point (52) may then be connected to the point (54), whereby forming a fold line (52)-(54) and a triangle (10)-(52)-(54). The point (51) may then be connected to the point (52), whereby forming a fold line (51)-(52) and a triangle (10)-(51)-(52). The point (51) may then be connected to the point (53), whereby forming a fold line (51)-(53) and a triangle (10)-(51)-(53). The point (41) may then be connected to the point (42), whereby forming a fold line (41)-(42) and a triangle (9)-(41)-(42). The point (20) may then be connected to the point (33), whereby forming a fold line (20)-(33) and a triangle (8)-(20)-(33). The point (23) may then be connected to the point (29), whereby forming a fold line (23)-(29) and a triangle (7)-(23)-(29). The point (23) may then be connected to the point (24), whereby forming a fold line (23)-(24) and a triangle (7)-(23)-(24). The point (24) may then be connected to the point (28), whereby forming a fold line (24)-(28) and a triangle (7)-(24)-(28). The point (27) may then be connected to the point (31), whereby forming a fold line (27)-(31) and a triangle (6)-(27)-(31). The point (37) may then be connected to the point (59), whereby forming a fold line (37)-(59) and a triangle (5)-(37)-(59). The point (46) may then be connected to the point (49), whereby forming a fold line (46)-(49) and a triangle (4)-(46)-(49). The point (46) may then be connected to the point (47), whereby forming a fold line (46)-(47) and a triangle (4)-(46)-(47). The point (47) may then be connected to the point (48), whereby forming a fold line (47)-(48) and a triangle (4)-(47)-(48). The point (36) may then be connected to the point (38), whereby forming a fold line (36)-(38) and a triangle (3)-(36)-(38). The point (35) may then be connected to the point (38), whereby forming a fold line (35)-(38) and a triangle (3)-(35)-(38). The point (32) may then be connected to the point (34), whereby forming a fold line (32)-(34) and a triangle (2)-(32)-(34). The point (39) may then be connected to the point (45), whereby forming a fold line (39)-(45) and a triangle (1)-(39)-(45).

To ensure the above steps have been correctly completed, various verifications may then be made. If any of the following verifications cannot be made, the earlier steps should be revisited to make necessary corrections. It may be verified that the fold line (24)-(28) has a distance of $\sqrt{[(Z_6XY)^2+(Z_5X)^2-2(Z_5Z_6X^2Y \cos(D))]}$. It may be verified that the fold line (23)-(29) has a distance of $\sqrt{[(Z_6XY)^2+(Z_4X)^2-2(Z_4Z_6X^2Y \cos(D))]}$. It may be verified that the fold line (23)-(24) has a distance of $\sqrt{[(Z_5X)^2+(Z_4X)^2-2(Z_4Z_5X^2 \cos(D))]}$. It may be verified that the fold line (46)-(47) has a distance of $\sqrt{[(Z_{17}X)^2+(Z_{18}X)^2-2(Z_{17}Z_{18}X^2 \cos(180-D))]}$. It may be verified that the fold line (46)-(49) has a distance of $\sqrt{[(Z_{17}X)^2+(Z_{19}XY)^2-2(Z_{17}Z_{19}X^2Y \cos(180-D))]}$. It may be verified that the fold line (47)-(48) has a distance of $\sqrt{[(Z_{19}XY)^2+(Z_{18}X)^2-2(Z_{18}Z_{19}X^2Y \cos(D))]}$. It may be verified that the fold line (37)-(59) has a distance of $\sqrt{[(Z_{12}XY)^2+(Z_{11}X)^2-2(Z_{11}Z_{12}X^2Y \cos(D))]}$. It may be verified that the fold line (36)-(38) has a distance of $\sqrt{[(Z_{12}XY)^2+(Z_{13}X)^2-2(Z_{12}Z_{13}X^2Y \cos(180-D))]}$. It may be verified that the fold line (35)-(38) has a distance of $\sqrt{[(Z_{13}X)^2+(Z_{11}X)^2-2(Z_{11}Z_{13}X^2 \cos(180-D))]}$. It may be verified that the fold line (27)-(31) has a distance of $\sqrt{[(Z_7XY)^2+(Z_8X)^2-2(Z_7Z_8X^2Y \cos(180-D))]}$. It may be verified that the fold line (20)-(33) has a distance of $\sqrt{[(Z_7XY)^2+(Z_9X)^2-2(Z_7Z_9X^2Y \cos(180-D))]}$. It may be verified that the fold line (32)-(34) has a distance of $\sqrt{[(Z_8X)^2+(Z_9X)^2-2(Z_8Z_9X^2 \cos(D))]}$. It may be verified that the fold line (39)-(45) has a distance of $\sqrt{[(Z_{14}X)^2+(Z_{16}X)^2-2(Z_{14}Z_{16}X^2 \cos(180-D))]}$. It may be verified that the fold line (43)-(44) has a distance of $\sqrt{[(Z_{15}XY)^2+(Z_{16}X)^2-2(Z_{15}Z_{16}X^2Y \cos(180-D))]}$. It may be verified that the fold line (41)-(42) has a distance of $\sqrt{[(Z_{14}X)^2+(Z_{15}XY)^2-2(Z_{14}Z_{15}X^2Y \cos(D))]}$. It may be verified that the fold line (15)-(16) has a distance of $\sqrt{[(Z_1X)^2+(Z_2X)^2-2(Z_1Z_2X^2 \cos(D))]}$. It may be verified that the fold line (16)-(17) has a distance of $\sqrt{[(Z_3XY)^2+(Z_2X)^2-2(Z_2Z_3X^2Y \cos(D))]}$. It may be verified that the fold line (18)-(19) has a distance of $\sqrt{[(Z_1X)^2+(Z_3XY)^2-2(Z_1Z_3X^2Y \cos(D))]}$. It may be verified that the fold line (55)-(57) has a distance of $\sqrt{[(Z_{25}XY)^2+(Z_{23}X)^2-2(Z_{23}Z_{25}X^2Y \cos(180-D))]}$. It may be verified that the fold line (56)-(58) has a distance of $\sqrt{[(Z_{25}XY)^2+(Z_{24}X)^2-2(Z_{24}Z_{25}X^2Y \cos(180-D))]}$. It may be verified that the fold line (55)-(56) has a distance of $\sqrt{[(Z_{24}X)^2+(Z_{23}X)^2-2(Z_{23}Z_{24}X^2 \cos(D))]}$. It may be verified that the fold line (51)-(53) has a distance of $\sqrt{[(Z_{22}XY)^2+(Z_{20}X)^2-2(Z_{20}Z_{22}X^2Y \cos(180-D))]}$. It may be verified that the fold line (51)-(52) has a distance of $\sqrt{[(Z_{21}X)^2+(Z_{20}X)^2-2(Z_{20}Z_{21}X^2 \cos(180-D))]}$. It may be verified that the fold line (52)-(54) has a distance of $\sqrt{[(Z_{21}X)^2+(Z_{22}XY)^2-2(Z_{21}Z_{22}X^2Y \cos(D))]}$.

To define the truncations, many modifications may then be made. First, either the (7)-(23)-(24) triangle, the (7)-(23)-(29) triangle, or the (7)-(24)-(28) triangle may be modified. Modifying the (7)-(23)-(24) triangle may include marking a point (f7) being equal to a distance of the fold line (24)-(28) away from the point (24) and being equal to a distance of the fold line (23)-(29) away from the point (23), whereby creating a triangle (f7)-(23)-(24). Modifying the (7)-(23)-(29) triangle may include marking a point (f7) being equal to a distance of the fold line (24)-(28) away from the point (29) and being equal to a distance of the fold line (23)-(24) away from the point (23), whereby creating a triangle (f7)-(23)-(29). Modifying the (7)-(24)-(28) triangle may include marking a point (f7) being equal to a distance of the fold line (23)-(24) away from the point (24) and being equal to a distance of the fold line (23)-(29) away from the point (28), whereby creating a triangle (f7)-(24)-(28).

Either the (4)-(46)-(47) triangle, the (4)-(46)-(49) triangle, or the (4)-(47)-(48) triangle may be modified. Modifying the (4)-(46)-(47) triangle may include marking a point (f4) being equal to a distance of the fold line (47)-(48) away from the point (47) and being equal to a distance of the fold line (46)-(49) away from the point (46), whereby creating a triangle (f4)-(46)-(47). Modifying the (4)-(46)-(49) triangle may include marking a point (f4) being equal to a distance of the fold line (47)-(48) away from the point (49) and being equal to a distance of the fold line (46)-(47) away from the point (46), whereby creating a triangle (f4)-(46)-(49). Modifying the (4)-(47)-(48) triangle may include marking a point (f4) being equal to a distance of the fold line (47)-(48) away from the point (47) and being equal to a distance of the fold line (46)-(49) away from the point (48), whereby creating a triangle (f4)-(47)-(48).

Either the (5)-(37)-(59) triangle, the (3)-(36)-(38) triangle, or the (3)-(35)-(38) triangle may be modified. Modifying the (5)-(37)-(59) triangle may include marking a point (f5) being equal to a distance of the fold line (36)-(38) away from the point (37) and being equal to a distance of the fold line (35)-(38) away from the point (59), whereby creating a triangle (f5)-(37)-(59). Modifying the (3)-(36)-(38) triangle may include marking a point (f5) being equal to a distance of the fold line (37)-(59) away from the point (36) and being equal to a distance of the fold line (35)-(38) away from the point (38), whereby creating a triangle (f5)-(36)-(38). Modifying the (3)-(35)-(38) triangle may include marking a point (f5) being equal to a distance of the fold line (37)-(59) away from the point (35) and being equal to a distance of the fold line (36)-(38) away from the point (38), whereby creating a triangle (f5)-(35)-(38).

Either the (6)-(27)-(31) triangle, the (8)-(20)-(33) triangle, or the (2)-(32)-(34) triangle may be modified. Modifying the (6)-(27)-(31) triangle may include marking a point (f6) being equal to a distance of the fold line (20)-(33) away from the point (27) and being equal to a distance of the fold line (32)-(34) away from the point (31), whereby creating a triangle (f6)-(27)-(31). Modifying the (8)-(20)-(33) triangle may include marking a point (f6) being equal to a distance of the fold line (32)-(34) away from the point (33) and being equal to a distance of the fold line (27)-(31) away from the point (20), whereby creating a triangle (f6)-(20)-(33). Modifying the (2)-(32)-(34) triangle may include marking a point (f6) being equal to a distance of the fold line (27)-(31) away from the point (32) and being equal to a distance of the fold line (20)-(33) away from the point (34), whereby creating a triangle (f6)-(32)-(34).

Either the (1)-(39)-(45) triangle, the (11)-(43)-(44) triangle, or the (9)-(41)-(42) triangle may be modified. Modifying the (1)-(39)-(45) triangle may include marking a point (f1) being equal to a distance of the fold line (41)-(42) away from the point (39) and being equal to a distance of the fold line (43)-(44) away from the point (45), whereby creating a triangle (f1)-(39)-(45). Modifying the (11)-(43)-(44) triangle may include marking a point (f1) being equal to a distance of the fold line (39)-(45) away from the point (44) and being equal to a distance of the fold line (41)-(42) away from the point (43), whereby creating a triangle (f1)-(43)-(44). Modifying the (9)-(41)-(42) triangle may include marking a point (f1) being equal to a distance of the fold line (43)-(44) away from the point (42) and being equal to a distance of the fold line (39)-(45) away from the point (41), whereby creating a triangle (f1)-(41)-(42).

Either the (12)-(18)-(19) triangle, the (14)-(16)-(17) triangle, or the (14)-(15)-(16) triangle may be modified. Modifying the (12)-(18)-(19) triangle may include marking a point (f12) being equal to a distance of the fold line (15)-(16) away from the point (19) and being equal to a distance of the fold line (16)-(17) away from the point (18), whereby creating a triangle (f12)-(18)-(19). Modifying the (14)-(16)-(17) triangle may include marking the point (f12) being equal to a distance of the fold line (18)-(19) away from the point (17) and being equal to a distance of the fold line (15)-(16) away from the point (16) whereby creating a triangle (f12)-(16)-(17). Modifying the (14)-(15)-(16) triangle may include marking the point (f12) being equal to a distance of the fold line (16)-(17) away from the point (16) and being equal to a distance of the fold line (18)-(19) away from the point (15) whereby creating a triangle (f12)-(15)-(16).

Either the (13)-(55)-(57) triangle, the (13)-(55)-(56) triangle, or the (13)-(56)-(58) triangle may be modified. Modifying the (13)-(55)-(57) triangle may include marking a point (f13) being equal to a distance of the fold line (56)-(58) away from the point (57) and being equal to a distance of the fold line (55)-(57) away from the point (55), whereby creating a triangle (f13)-(55)-(57). Modifying the (13)-(55)-(56) triangle may include marking a point (f13) being equal to a distance of the fold line (55)-(57) away from the point (55) and being equal to a distance of the fold line (56)-(58) away from the point (56), whereby creating a triangle (f13)-(55)-(56). Modifying the (13)-(56)-(58) triangle may include marking a point (f13) being equal to a distance of the fold line (55)-(57) away from the point (58) and being equal to a distance of the fold line (55)-(56) away from the point (56), whereby creating a triangle (f13)-(56)-(58).

Either the (10)-(51)-(53) triangle, the (10)-(52)-(54) triangle, or the (10)-(51)-(52) triangle may be modified. Modifying the (10)-(51)-(53) triangle may include marking a point (f10) being equal to a distance of the fold line (52)-(54) away from the point (53) and being equal to a distance of the fold line (51)-(52) away from the point (51), whereby creating a triangle (f10)-(51)-(53). Modifying the (10)-(52)-(54) triangle may include marking a point (f10) being equal to a distance of the fold line (51)-(53) away from the point (54) and being equal to a distance of the fold line (51)-(52) away from the point (52), whereby creating a triangle (f10)-(52)-(54). Modifying the (110)-(51)-(52) triangle may include marking a point (f10) being equal to a distance of the fold line (51)-(53) away from the point (51) and being equal to a distance of the fold line (52)-(54) away from the point (52), whereby creating a triangle (f10)-(51)-(52).

A three dimensional polyhedra (100) may be produced according to the above-described method by using the following values and including the following steps. (Y)=0.8; $(Z_1)=(Z_2)=0.53$; $(Z_3)=(Z_4)=(Z_5)=(Z_6)=0.6$; $(Z_7)=(Z_8)=(Z_9)=(Z_{11})=0$; $(Z_{12})=(Z_{13})=(Z_{14})=(Z_{15})=(Z_{16})=(Z_{17})=(Z_{18})=(Z_{19})=(Z_{29})=(Z_{21})=(Z_{22})=(Z_{23})=(Z_{24})=(Z_{25})=0$; D=80 degrees. (X) may still be any positive value greater than zero, and the selection of (X) affects only the size of the resulting polyhedra.

A point (25) may be marked along the fold line (24)-(28) at a distance of 0.6 multiplied by (X), also denoted 0.6(X), from the point (24). A point (26) may be marked along the line (5)-(6) at a distance of 0.86 multiplied by (X), also denoted 0.86(X), from the point (5) The point (25) may then be connected to the point (26), creating a fold line (25)-(26).

A point (22) may be marked along the fold line (23)-(29) at the distance of 0.6(X) from the point (23). A point (21) may be marked along the line (8)-(9) at the distance of 0.86(X) from the point (9). The point (21) may then be connected to the point (22), creating a fold line (21)-(22).

A point (50) may be marked at a midpoint of the fold line (1)-(3). The point (2) may then be connected to the point (50), creating a line (2)-(50) which is perpendicular to the fold line (1)-(3). A point (2f) may be marked along the line (2)-(50), the point (2f) being the distance of 0.86(X) from the point (1) and the distance of 0.86(X) from the point (3). A new triangle, (1)-(2f)-(3), is created with the point (2f).

The triangle (12)-(18)-(19) is modified to form the triangle (f12)-(18)-(19).

The polyhedron net (120) may then be separated from excess foldable material 110 by cutting along the following lines: (1)-(2f)-(3)-(4)-(5)-(6)-(7)-(8)-(9)-(10)-(11)-(19)-(f12)-(18)-(13)-(14)-(1). The line (14)-(16) may then be cut.

The polyhedron net (120) may then be folded along the fold lines (23)-(29), (24)-(28), (21)-(22), (25)-(26), (15)-(16), (16)-(17), (18)-(19), (23)-(24) with all of the fold lines being located on an exterior surface of the polyhedron.

The line (25)-(26) may be secured to the line (21)-(22). The line (9)-(10) may be secured to the line (10)-(11). The line (4)-(5) may be secured to the line (3)-(4). The line (13)-(18) may be secured to the line (13)-(17). The line (2f)-(3) may be secured to the line (5)-(26). The line (1)-(2f) may be secured to the line (9)-(21). The line (1)-(15) may be secured to the line (11)-(19). The line (7)-(28) may be secured to the line (7)-(29). The line (7)-(23) may be secured to the line (22)-(23). The line (7)-(24) may be secured to the line (24)-(25). The line (f12)-(19) may be secured to the line (15)-(16). The line (f12)-(18) may be secured to the line (16)-(17).

Figure 3:
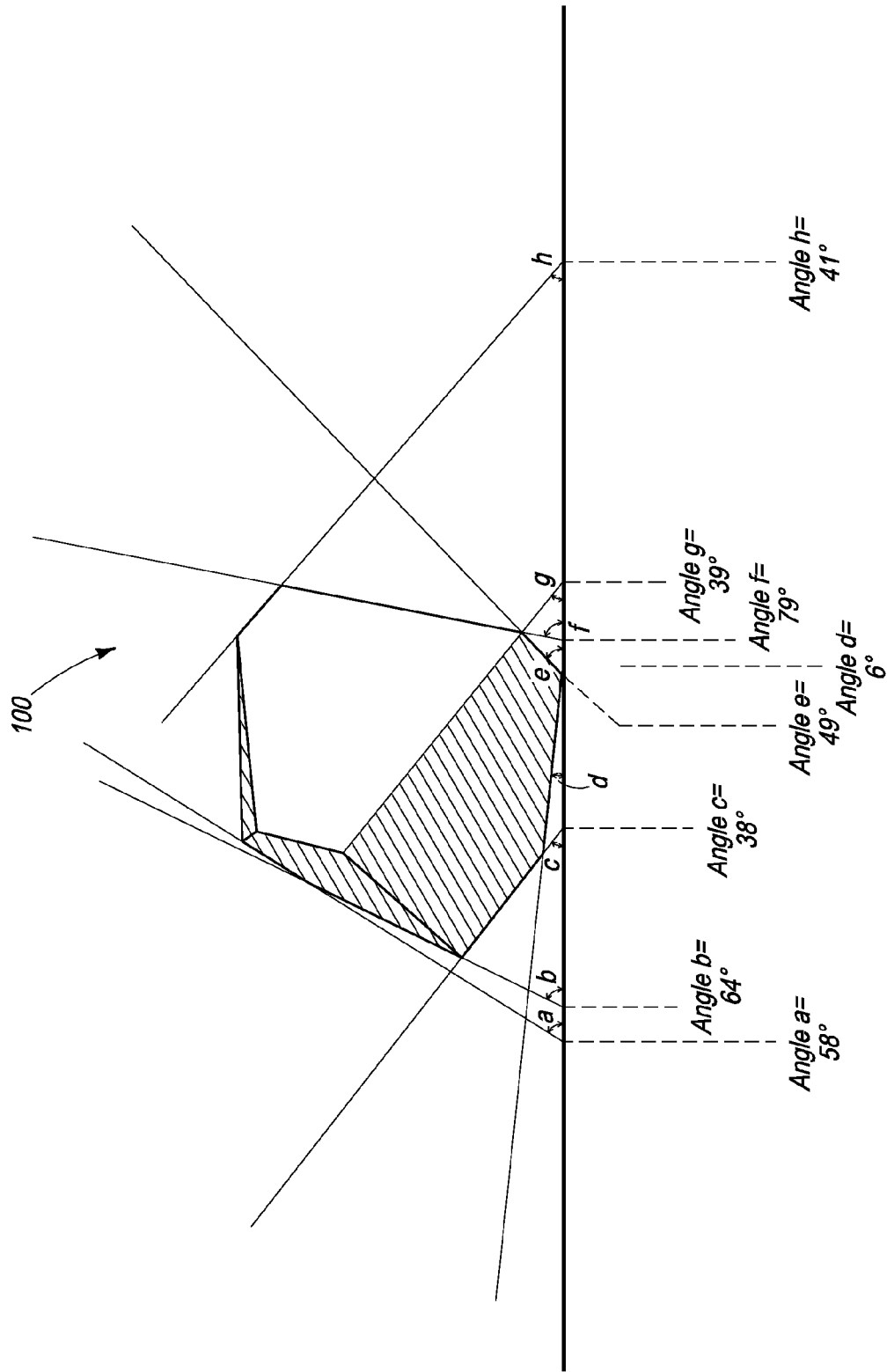
FIG. 3 shows a polyhedron created from the polyhedral net as in FIG. 2.
Figure 4:
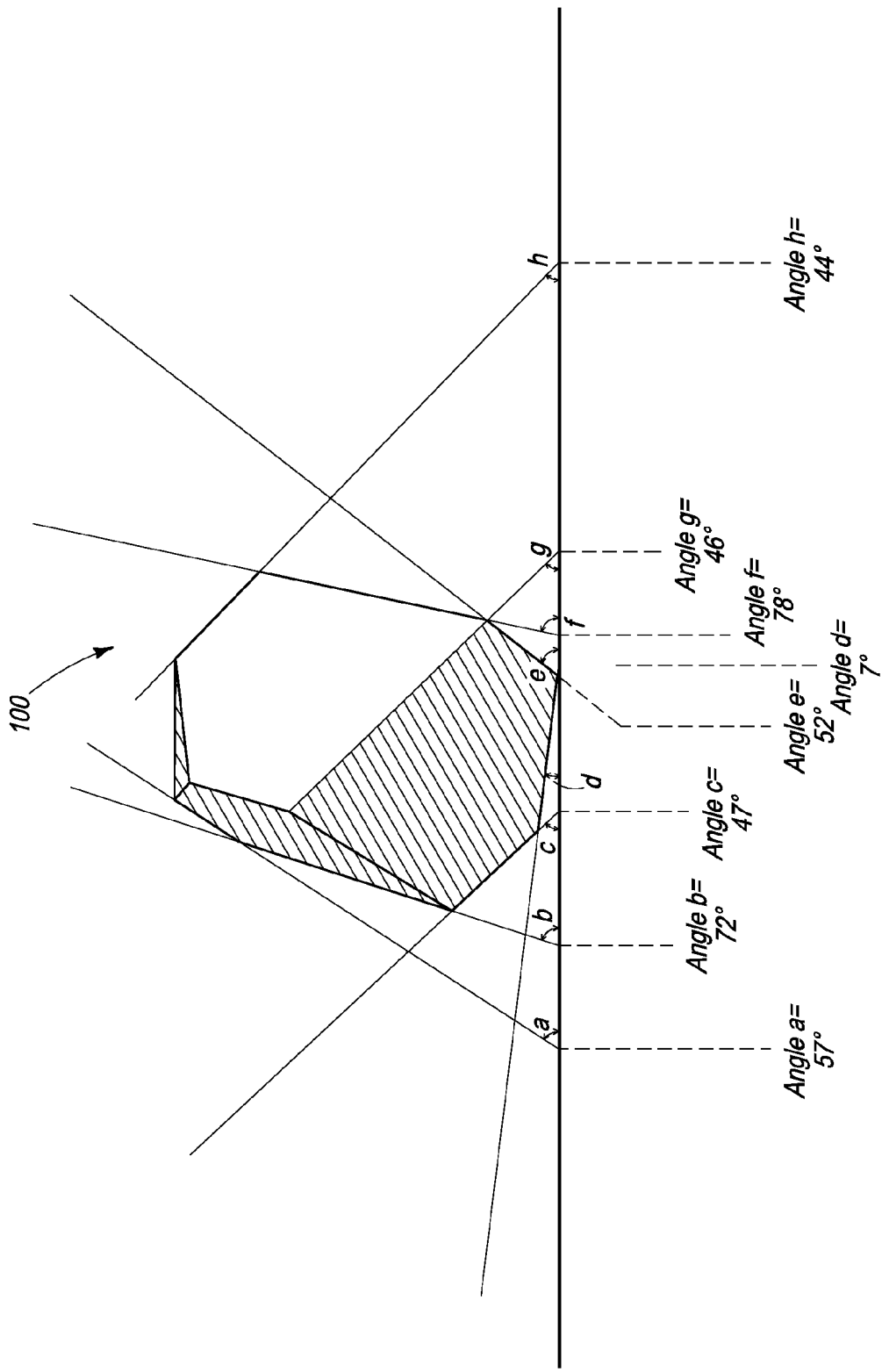
FIG. 4 shows a polyhedron created from the polyhedral net as in FIG. 1, the polyhedral net having a value of D=72 degrees and Y=1.
Figure 5:
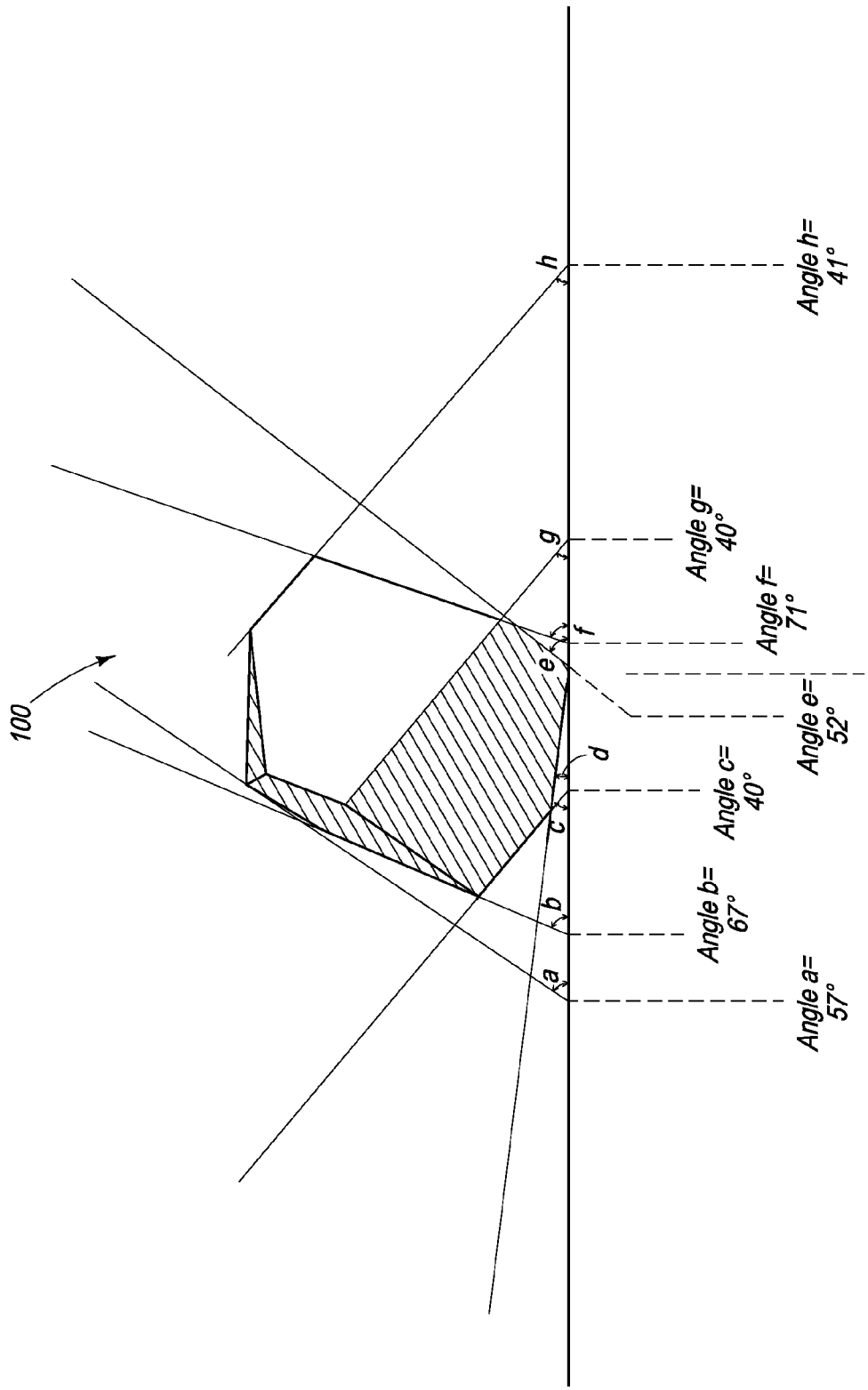
FIG. 5 shows the polyhedron as in FIG. 7 from a perspective corresponding to a perspective seen in Melencolia I by Albrecht Dürer.
Figure 6:
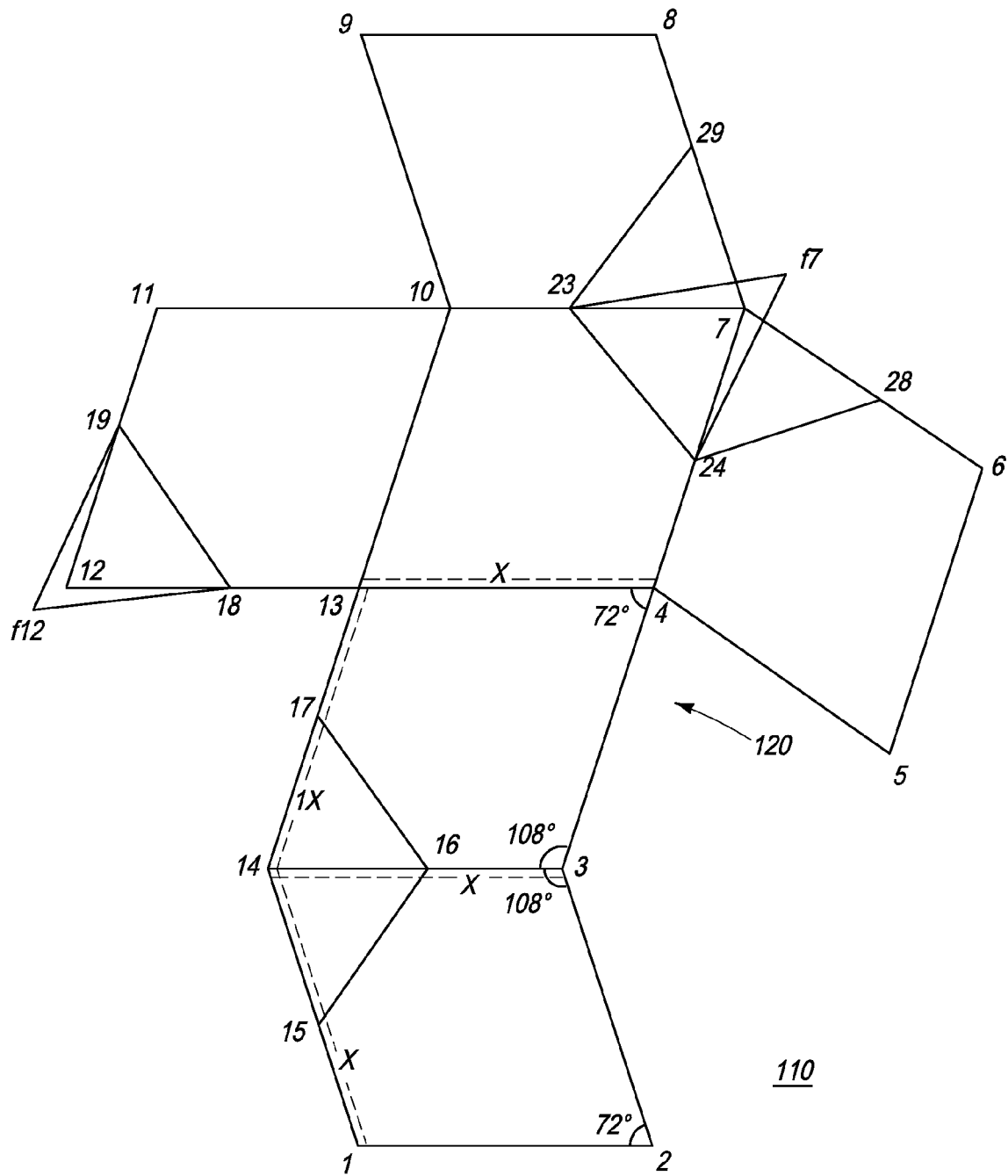
FIG. 6 shows a polyhedral net according to an embodiment, the polyhedral net having a value of D=72 degrees and Y=1.
Figure 7:
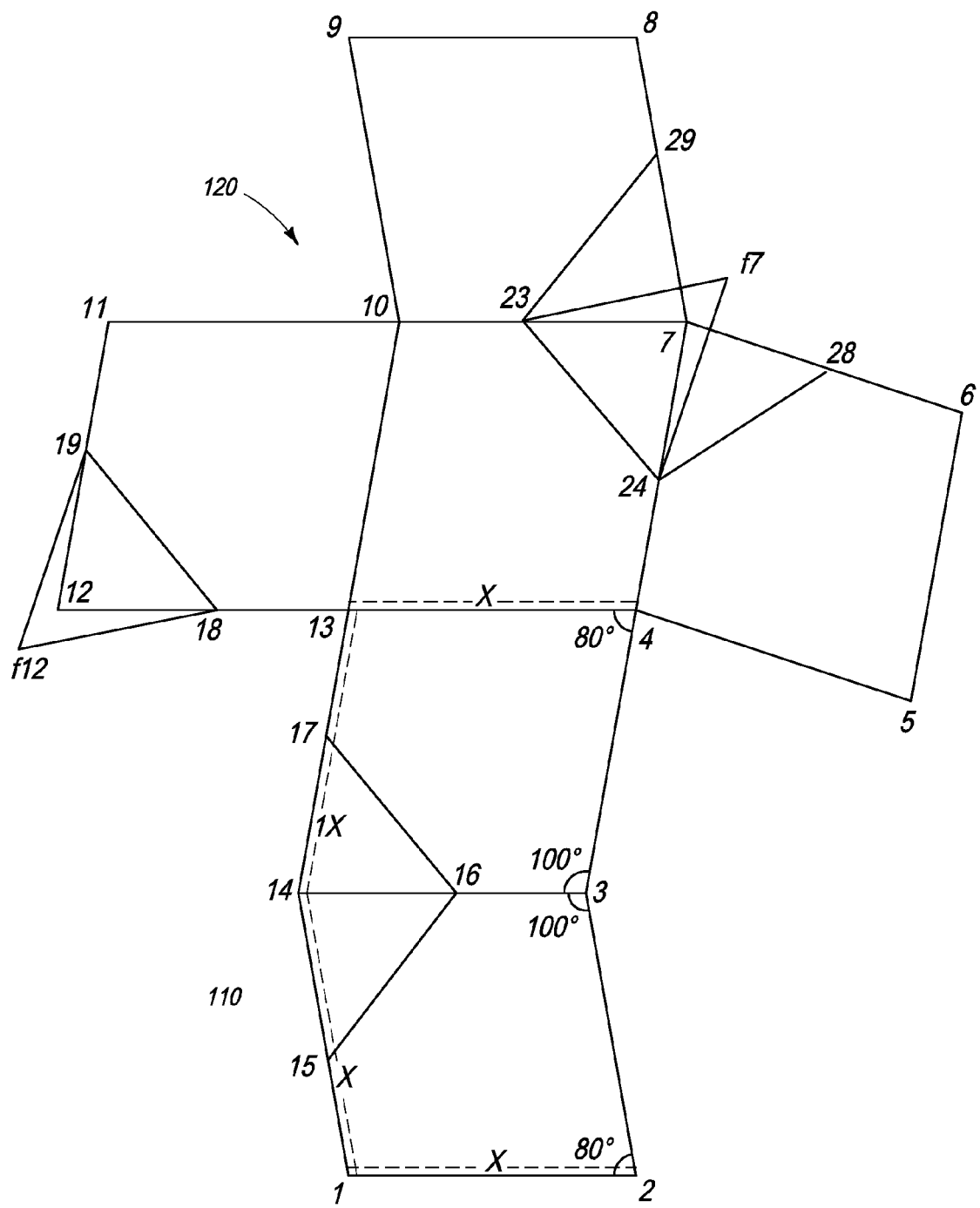
FIG. 7 shows a polyhedral net according to an embodiment, the polyhedral net having a value of D=80 degrees and Y=1.

FIGS. 3 through 5 show polyhedrons (100) created using the above-described method. The polyhedron (100) shown in FIG. 3 has a value of D=80 degrees and Y=0.8. The polyhedron (100) shown in FIG. 5 from a slightly different angle, corresponding generally to a perspective seen in Melencolia I by Albrecht Dürer is the rhombohedron with values of D=80 degrees and Y=1. The rhombohedron (100) shown in FIG. 4 has a value of D=72 degrees and Y=1.

By performing the mathematical steps above, various mathematical lessons may be taught/learned, including lessons relating to algebra, trigonometry, and geometry.

Various science lessons may be taught/learned as well, such as determining a volume of the polyhedron (100), determining how forces would be transferred through the polyhedron (100), etc. Various loads may be positioned upon the polyhedrons (100) to aid in understanding force transfer and load abilities/limits. In doing this, the polyhedrons (100) may be different sizes or may be constructed from different foldable material (110).

Further, art lessons may be taught/learned by following the steps above, including mechanical drafting lessons, perspective lessons, and others.

Those skilled in the art appreciate that variations from the specified embodiments disclosed above are contemplated herein. The description should not be restricted to the above embodiments, but should be measured by the following claims.

What is claimed is:

1. A method of constructing a three dimensional hexahedron, the method comprising the steps of:

providing a flat piece of foldable material;

defining an orthogonal coordinate system on the material, the coordinate system having a horizontal axis denoted (a), a vertical axis denoted (i), and an origin denoted (1);

selecting a value for a distance (X) that is greater than zero;

selecting a value for a constant (Y) that is greater than zero;

multiplying the distance value (X) by the constant (Y) to obtain a distance value (XY);

selecting a value for an angle (D) that is between, but not including, 0 and 180 degrees;

drawing a line along (a) from the origin (1) to a new point (2) that is the distance (X) from the origin (1), whereby forming a line (1)-(2);

continuing the line from the point (2) at an angle of (180−D) degrees from (α) to a new point (3) that is the distance (X) from the point (2), whereby forming a line (2)-(3);

continuing the line from the point (3) at the angle of (D) degrees from (α) to a new point (4) that is the distance (XY) from the point (3), whereby forming a line (3)-(4);

continuing the line from the point (4) at an angle of (−[180−2D]) degrees from (α) to new point (5) that is the distance (XY) from the point (4), whereby forming a line (4)-(5);

continuing the line from the point (5) at an angle of (D) degrees from (α) to a new point (6) that is the distance (X) from the point (5), whereby forming a line (5)-(6);

continuing the line from the point (6) at an angle of (2D) degrees from (α) a new point (7) that is the distance (XY) from the point (6), whereby forming a line (6)-(7);

continuing the line from the point (7) at an angle of (180−D) degrees from (α) to a new point (8) that is the distance (XY) from the point (7), whereby forming a line (7)-(8);

continuing the line from the point (8) at an angle of 180 degrees from (α) to a new point (9) that is the distance (X) from the point (8), whereby forming a line (8)-(9);

continuing the line from the point (9) at an angle of (−D) degrees from (α) to a new point (10) that is the distance (XY) from the point (9), whereby forming a line (9)-(10);

continuing the line from the point (10) at an angle of 180 degrees from (α) to a new point (11) that is the distance (XY) from the point (10), whereby forming a line (10)-(11);

continuing the line from the point (11) at an angle of (−[180−D]) degrees from (α) to a new point (12) that is the distance (X) from the point (11), whereby forming a line (11)-(12);

continuing the line from the point (12) at an angle of 0 degrees from (α) to a new point (13) that is the distance (XY) from the point (12), whereby forming a line (12)-(13);

continuing the line from the point (13) at an angle of (−[180−D]) degrees from (α) to a new point (14) that is the distance (XY) from the point (13), whereby forming a line (13)-(14);

continuing the line from the point (14) at an angle of (−D) degrees from (α) to the origin (1) that is the distance (X) from the point (14), whereby forming a line (14)-(1);

connecting the point (14) to the point (3), whereby forming a fold line (3)-(14);

connecting the point (13) to the point (4), whereby forming a fold line (4)-(13);

connecting the point (13) to the point (10), whereby forming a fold line (10)-(13);

connecting the point (10) to the point (7), whereby forming a fold line (7)-(10);

connecting the point (4) to the point (7), whereby forming a fold line (4)-(7);

cutting along the following lines: (1)-(2), (2)-(3), (3)-(4), (4)-(5), (5)-(6), (6)-(7), (7)-(8), (8)-(9), (9)-(10), (10)-(11), (11)-(12), (12)-(13), (13)-(14), (14)-(1);

folding along the fold lines (3)-(14), (4)-(13), (10)-(13), (7)-(10), and (4)-(7) to begin to form a polyhedron, all of the fold lines being located on an exterior surface of the polyhedron;

securing the line (7)-(8) to the line (7)-(6), whereby forming a polyhedral edge ((7)-(8))-((6)-(7));

securing the line (9)-(10) to the line (10)-(11), whereby forming a polyhedral edge ((9)-(10))-((10)-(11));

securing the line (4)-(5) to the line (3)-(4), whereby forming a polyhedral edge ((4)-(5))-((3)-(4));

securing the line (12)-(13) to the line (13)-(14), whereby forming a polyhedral edge ((12)-(13))-((13)-(14));

securing the line (2)-(3) to the line (5)-(6), whereby forming a polyhedral edge ((2)-(3))-((5)-(6));

securing the line (1)-(2) to the line (8)-(9), whereby forming a polyhedral edge ((1)-(2))-((8)-(9));

securing the line (1)-(14) to the line (11)-(12), whereby forming a polyhedral edge ((1)-(14))-((11)-(12)).

2. A method of producing a plurality of polyhedron nets for a truncated polyhedron, the method comprising the steps of:

providing a flat piece of foldable material;

defining an orthogonal coordinate system on the material, the coordinate system having a horizontal axis denoted (a), a vertical axis denoted ($\alpha$), and an origin denoted (1);

selecting a value for a distance (X) that is greater than zero;

selecting a value for a constant (Y) that is greater than zero;

selecting values equal to or greater than zero and equal to or less than one for the truncating constants ($Z_1$), ($Z_2$), ($Z_3$), ($Z_4$), ($Z_5$), ($Z_6$), ($Z_7$), ($Z_8$), ($Z_9$), ($Z_{11}$), ($Z_{12}$), ($Z_{13}$), ($Z_{14}$), ($Z_{15}$), ($Z_{16}$), ($Z_{17}$), ($Z_{18}$), ($Z_{19}$), ($Z_{20}$), ($Z_{21}$), ($Z_{22}$), ($Z_{23}$), ($Z_{24}$), ($Z_{25}$);

the value for the truncating constant ($Z_7$) being less than or equal to: one minus the truncating constant ($Z_6$);

the value for the truncating constant ($Z_{11}$) being less than or equal to: one minus the truncating constant ($Z_8$);

the value for the truncating constant ($Z_{13}$) being less than or equal to: one minus the truncating constant ($Z_2$);

the value for the truncating constant ($Z_{14}$) being less than or equal to: one minus the truncating constant ($Z_9$);

the value for the truncating constant ($Z_{16}$) being less than or equal to: one minus the truncating constant ($Z_1$);

the value for the truncating constant ($Z_{17}$) being less than or equal to: one minus the truncating constant ($Z_5$);

the value for the truncating constant ($Z_{19}$) being less than or equal to: one minus the truncating constant ($Z_{12}$);

the value for the truncating constant ($Z_{20}$) being less than or equal to: one minus the truncating constant ($Z_4$);

the value for the truncating constant ($Z_{22}$) being less than or equal to: one minus the truncating constant ($Z_{15}$);

the value for the truncating constant ($Z_{23}$) being less than or equal to: one minus the truncating constant ($Z_{21}$);

the value for the truncating constant ($Z_{24}$) being less than or equal to: one minus the truncating constant ($Z_{18}$);

the value for the truncating constant ($Z_{25}$) being less than or equal to: one minus the truncating constant ($Z_3$);

selecting a value for an angle (D) that is between, but not including, 0 and 180 degrees;

drawing a line along (a) from the origin (1) to a new point (2) that is the distance (X) from the origin (1), whereby forming a line (1)-(2);

continuing the line from the point (2) at an angle of (180−D) degrees from ($\alpha$) to a new point (3) that is the distance (X) from the point (2), whereby forming a line (2)-(3);

continuing the line from the point (3) at the angle of (D) degrees from ($\alpha$) to a new point (4) that is the distance (XY) from the point (3), whereby forming a line (3)-(4);

continuing the line from the point (4) at an angle of (−[180−2D]) degrees from ($\alpha$) to new point (5) that is the distance (XY) from the point (4), whereby forming a line (4)-(5);

continuing the line from the point (5) at an angle of (D) degrees from ($\alpha$) to a new point (6) that is the distance (X) from the point (5), whereby forming a line (5)-(6);

continuing the line from the point (6) at an angle of (2D) degrees from ($\alpha$) a new point (7) that is the distance (XY) from the point (6), whereby forming a line (6)-(7);

continuing the line from the point (7) at an angle of (180−D) degrees from ($\alpha$) to a new point (8) that is the distance (XY) from the point (7), whereby forming a line (7)-(8);

continuing the line from the point (8) at an angle of 180 degrees from ($\alpha$) to a new point (9) that is the distance (X) from the point (8), whereby forming a line (8)-(9);

continuing the line from the point (9) at an angle of (−D) degrees from ($\alpha$) to a new point (10) that is the distance (XY) from the point (9), whereby forming a line (9)-(10);

continuing the line from the point (10) at an angle of 180 degrees from ($\alpha$) to a new point (11) that is the distance (XY) from the point (10), whereby forming a line (10)-(11);

continuing the line from the point (11) at an angle of (−[180−D]) degrees from ($\alpha$) to a new point (12) that is the distance (X) from the point (11), whereby forming a line (11)-(12);

continuing the line from the point (12) at an angle of 0 degrees from ($\alpha$) to a new point (13) that is the distance (XY) from the point (12), whereby forming a line (12)-(13);

continuing the line from the point (13) at an angle of (−[180−D]) degrees from ($\alpha$) to a new point (14) that is the distance (XY) from the point (13), whereby forming a line (13)-(14);

continuing the line from the point (14) at an angle of (−D) degrees from ($\alpha$) to the origin (1) that is the distance (X) from the point (14), whereby forming a line (14)-(1);

connecting the point (14) to the point (3), whereby forming a fold line (3)-(14);

connecting the point (13) to the point (4), whereby forming a fold line (4)-(13);

connecting the point (13) to the point (10), whereby forming a fold line (10)-(13);

connecting the point (10) to the point (7), whereby forming a fold line (7)-(10);

connecting the point (4) to the point (7), whereby forming a fold line (4)-(7);

marking a point (15) along line (14)-(1), the point (15) being a distance ($Z_1X$) from the point (14);

marking a point (19) along line (11)-(12), the point (19) being the distance ($Z_1X$) from the point (12);

marking a point (16) along the fold line (3)-(14), the point (16) being a distance ($Z_2X$) from the point (14);

marking a point (17) along the line (13)-(14), the point (17) being a distance ($Z_3XY$) from the point (14);

marking a point (18) along the line (12)-(13), the point (18) being the distance ($Z_3XY$) from the point (12);

marking a point (23) along the fold line (7)-(10), the point (23) being a distance ($Z_4X$) from the point (7);

marking a point (24) along the fold line (4)-(7), the point (24) being a distance ($Z_5X$) from the point (7);

marking a point (28) along the line (6)-(7), the point (28) being a distance ($Z_6XY$) from the point (7);

marking a point (29) along the line (7)-(8), the point (29) being the distance ($Z_6XY$) from the point (7);

marking a point (27) along the line (6)-(7), the point (27) being a distance ($Z_7XY$) from the point (6);
marking a point (20) along the line (7)-(8), the point (20) being the distance ($Z_7XY$) from the point (8);
marking a point (31) along the line (5)-(6), the point (31) being a distance ($Z_8X$) from the point (6);
marking a point (32) along the line (2)-(3), the point (32) being the distance ($Z_8X$) from the point (2);
marking a point (33) along the line (8)-(9), the point (33) being a distance ($Z_9X$) from the point (8);
marking a point (34) along the line (1)-(2), the point (34) being the distance ($Z_9X$) from the point (2);
marking a point (59) along the line (5)-(6), the point (59) being a distance ($Z_{11}X$) from the point (5);
marking a point (35) along the line (2)-(3), the point (35) being the distance ($Z_{11}X$) from the point (3);
marking a point (36) along the line (3)-(4), the point (36) being a distance ($Z_{12}XY$) from the point (3);
marking a point (37) along the line (4)-(5), the point (37) being the distance ($Z_{12}XY$) from the point (5);
marking a point (38) along the fold line (3)-(14), the point (38) being a distance ($Z_{13}X$) from the point (3);
marking a point (39) along the line (1)-(2), the point (39) being a distance ($Z_{14}X$) from the point (1);
marking a point (41) along the line (8)-(9), the point (41) being the distance ($Z_{14}X$) from the point (9);
marking a point (42) along the line (9)-(10), the point (42) being a distance ($Z_{15}XY$) from the point (9);
marking a point (43) along the line (10)-(11), the point (43) being the distance ($Z_{15}XY$) from the point (11);
marking a point (44) along the line (11)-(12), the point (44) being a distance ($Z_{16}X$) from the point (11);
marking a point (45) along the line (14)-(1), the point (45) being the distance ($Z_{16}X$) from the point (1);
marking a point (46) along the fold line (4)-(7), the point (46) being a distance ($Z_{17}X$) from the point (4);
marking a point (47) along the fold line (4)-(13), the point (47) being a distance ($Z_{18}X$) from the point (4);
marking a point (48) along the line (3)-(4), the point (48) being a distance ($Z_{19}XY$) from the point (4);
marking a point (49) along the line (4)-(5), the point (49) being the distance ($Z_{19}XY$) from the point (4);
marking a point (51) along the fold line (7)-(10), the point (51) being a distance ($Z_{20}X$) from the point (10);
marking a point (52) along the fold line (10)-(13), the point (52) being a distance ($Z_{21}X$) from the point (10);
marking a point (53) along the line (9)-(10), the point (53) being a distance ($Z_{22}XY$) from the point (10);
marking a point (54) along the line (10)-(11), the point (54) being a distance ($Z_{22}XY$) from the point (10);
marking a point (55) along the fold line (10)-(13), the point (55) being a distance ($Z_{23}X$) from the point (13);
marking a point (56) along the fold line (4)-(13), the point (56) being a distance ($Z_{24}X$) from the point (13);
marking a point (57) along the line (12)-(13), the point (57) being a distance ($Z_{25}XY$) from the point (13);
marking a point (58) along the line (13)-(14), the point (58) being the distance ($Z_{25}XY$) from the point (13);
connecting the point (15) to the point (16), whereby forming a fold line (15)-(16) and a triangle (14)-(15)-(16);
connecting the point (16) to the point (17), whereby forming a fold line (16)-(17) and a triangle (14)-(16)-(17);
connecting the point (56) to the point (58), whereby forming a fold line (56)-(58) and a triangle (13)-(56)-(58);
connecting the point (55) to the point (56), whereby forming a fold line (55)-(56) and a triangle (13)-(55)-(56);
connecting the point (55) to the point (57), whereby forming a fold line (55)-(57) and a triangle (13)-(55)-(57);
connecting the point (18) to the point (19), whereby forming a fold line (18)-(19) and a triangle (12)-(18)-(19);
connecting the point (43) to the point (44), whereby forming a fold line (43)-(44) and a triangle (111)-(43)-(44);
connecting the point (52) to the point (54), whereby forming a fold line (52)-(54) and a triangle (10)-(52)-(54);
connecting the point (51) to the point (52), whereby forming a fold line (51)-(52) and a triangle (10)-(51)-(52);
connecting the point (51) to the point (53), whereby forming a fold line (51)-(53) and a triangle (10)-(51)-(53);
connecting the point (41) to the point (42), whereby forming a fold line (41)-(42) and a triangle (9)-(41)-(42);
connecting the point (20) to the point (33), whereby forming a fold line (20)-(33) and a triangle (8)-(20)-(33);
connecting the point (23) to the point (29), whereby forming a fold line (23)-(29) and a triangle (7)-(23)-(29);
connecting the point (23) to the point (24), whereby forming a fold line (23)-(24) and a triangle (7)-(23)-(24);
connecting the point (24) to the point (28), whereby forming a fold line (24)-(28) and a triangle (7)-(24)-(28);
connecting the point (27) to the point (31), whereby forming a fold line (27)-(31) and a triangle (6)-(27)-(31);
connecting the point (37) to the point (59), whereby forming a fold line (37)-(59) and a triangle (5)-(37)-(59);
connecting the point (46) to the point (49), whereby forming a fold line (46)-(49) and a triangle (4)-(46)-(49);
connecting the point (46) to the point (47), whereby forming a fold line (46)-(47) and a triangle (4)-(46)-(47);
connecting the point (47) to the point (48), whereby forming a fold line (47)-(48) and a triangle (4)-(47)-(48);
connecting the point (36) to the point (38), whereby forming a fold line (36)-(38) and a triangle (3)-(36)-(38);
connecting the point (35) to the point (38), whereby forming a fold line (35)-(38) and a triangle (3)-(35)-(38);
connecting the point (32) to the point (34), whereby forming a fold line (32)-(34) and a triangle (2)-(32)-(34);
connecting the point (39) to the point (45), whereby forming a fold line (39)-(45) and a triangle (1)-(39)-(45);
verifying that the fold line (24)-(28) has a distance of $\sqrt{[(Z_6XY)^2+(Z_5X)^2-2(Z_5Z_6X^2Y\cos(D))]}$;
verifying that the fold line (23)-(29) has a distance of $\sqrt{[(Z_6XY)^2+(Z_4X)^2-2(Z_4Z_6X^2Y\cos(D))]}$;
verifying that the fold line (23)-(24) has a distance of $\sqrt{[(Z_5X)^2+(Z_4X)^2-2(Z_4Z_5X^2\cos(D))]}$;
modifying a triangle selected from the group consisting of the (7)-(23)-(24) triangle, the (7)-(23)-(29) triangle, and the (7)-(24)-(28) triangle;
verifying that the fold line (46)-(47) has a distance of $\sqrt{[(Z_{17}X)^2+(Z_{18}X)^2-2(Z_{17}Z_{18}X^2\cos(180-D))]}$;
verifying that the fold line (46)-(49) has a distance of $\sqrt{[(Z_{17}X)^2+(Z_{19}XY)^2-^2(Z_{17}Z_{19}X^2Y\cos(180-D))]}$;
verifying that the fold line (47)-(48) has a distance of $\sqrt{[(Z_{19}XY)^2+(Z_{18}X)^2-2(Z_{18}Z_{19}X^2Y\cos(D))]}$;
modifying a triangle selected from the group consisting of the (4)-(46)-(47) triangle, the (4)-(46)-(49) triangle, and the (4)-(47)-(48) triangle;
verifying that the fold line (37)-(59) has a distance of $\sqrt{[(Z_{12}XY)^2+(Z_{11}X)^2-2(Z_{11}Z_{12}X^2Y\cos(D))]}$;
verifying that the fold line (36)-(38) has a distance of $\sqrt{[(Z_{12}XY)^2+(Z_{13}X)^2-2(Z_{12}Z_{13}X^2Y\cos(180-D))]}$;
verifying that the fold line (35)-(38) has a distance of $\sqrt{[(Z_{13}X)^2+(Z_{11}X)^2-2(Z_{11}Z_{13}X^2\cos(180-D))]}$;
modifying a triangle selected from the group consisting of the (5)-(37)-(59) triangle, the (3)-(36)-(38) triangle, and the (3)-(35)-(38) triangle;

verifying that the fold line (27)-(31) has a distance of
$\sqrt{[(Z_7XY)^2+(Z_8X)^2-2(Z_7Z_8X^2Y\cos(180-D))]}$;
verifying that the fold line (20)-(33) has a distance of
$\sqrt{[(Z_7XY)^2+(Z_9X)^2-2(Z_7Z_9X^2Y\cos(180-D))]}$;
verifying that the fold line (32)-(34) has a distance of
$\sqrt{[(Z_8X)^2+(Z_9X)^2-2(Z_8Z_9X^2\cos(D))]}$;
modifying a triangle selected from the group consisting of the (6)-(27)-(31) triangle, the (8)-(20)-(33) triangle, and the (2)-(32)-(34) triangle;
verifying that the fold line (39)-(45) has a distance of
$\sqrt{[(Z_{14}X)^2+(Z_{16}X)^2-2(Z_{14}Z_{16}X^2\cos(180-D))]}$;
verifying that the fold line (43)-(44) has a distance of
$\sqrt{[(Z_{15}XY)^2+(Z_{16}X)^2-2(Z_{15}Z_{16}X^2Y\cos(180—D))]}$;
verifying that the fold line (41)-(42) has a distance of
$\sqrt{[(Z_{14}X)^2+(Z_{15}XY)^2-2(Z_{14}Z_{15}X^2Y\cos(D))]}$;
modifying a triangle selected from the group consisting of the (1)-(39)-(45) triangle, the (11)-(43)-(44) triangle, and the (9)-(41)-(42) triangle;
verifying that the fold line (15)-(16) has a distance of
$\sqrt{[(Z_1X)^2+(Z_2X)^2-2(Z_1Z_2X^2\cos(D))]}$;
verifying that the fold line (16)-(17) has a distance of
$\sqrt{[(Z_3XY)^2+(Z_2X)^2-2(Z_2Z_3X^2Y\cos(D))]}$;
verifying that the fold line (18)-(19) has a distance of
$\sqrt{[(Z_1X)^2+(Z_3XY)^2-2(Z_1Z_3X^2Y\cos(D))]}$;
modifying a triangle selected from the group consisting of the (12)-(18)-(19) triangle, the (14)-(16)-(17) triangle, and the (14)-(15)-(16) triangle;
verifying that the fold line (55)-(57) has a distance of
$\sqrt{[(Z_{25}XY)^2+(Z_{23}X)^2-2(Z_{23}Z_{25}X^2Y\cos(180-D))]}$;
verifying that the fold line (56)-(58) has a distance of
$\sqrt{[(Z_{25}XY)^2+(Z_{24}X)^2-2(Z_{24}Z_{25}X^2Y\cos(180-D))]}$;
verifying that the fold line (55)-(56) has a distance of
$\sqrt{[(Z_{24}X)^2+(Z_{23}X)^2-2(Z_{23}Z_{24}X^2\cos(D))]}$;
modifying a triangle selected from the group consisting of the (13)-(55)-(57) triangle, the (13)-(55)-(56) triangle, and the (13)-(56)-(58) triangle;
verifying that the fold line (51)-(53) has a distance of
$\sqrt{[(Z_{22}XY)^2+(Z_{20}X)^2-2(Z_{20}Z_{22}X^2Y\cos(180-D))]}$;
verifying that the fold line (51)-(52) has a distance of
$\sqrt{[(Z_{21}X)^2+(Z_{20}X)^2-2(Z_{20}Z_{21}X^2\cos(180-D))]}$;
verifying that the fold line (52)-(54) has a distance of
$\sqrt{[(Z_{21}X)^2+(Z_{22}XY)^2-2(Z_{21}Z_{22}X^2Y\cos(D))]}$; and
modifying a triangle selected from the group consisting of the (10)-(51)-(53) triangle, the (10)-(52)-(54) triangle, and the (10)-(51)-(52) triangle.

3. The method as in claim 2, wherein:
modifying the (7)-(23)-(24) triangle includes marking a point (f7) being equal to a distance of the fold line (24)-(28) away from the point (24) and being equal to a distance of the fold line (23)-(29) away from the point (23), whereby creating a triangle (f7)-(23)-(24);
modifying the (7)-(23)-(29) triangle includes marking a point (f7) being equal to a distance of the fold line (24)-(28) away from the point (29) and being equal to a distance of the fold line (23)-(24) away from the point (23), whereby creating a triangle (f7)-(23)-(29);
modifying the (7)-(24)-(28) triangle includes marking a point (f7) being equal to a distance of the fold line (23)-(24) away from the point (24) and being equal to a distance of the fold line (23)-(29) away from the point (28), whereby creating a triangle (f7)-(24)-(28);
modifying the (4)-(46)-(47) triangle includes marking a point (f4) being equal to a distance of the fold line (47)-(48) away from the point (47) and being equal to a distance of the fold line (46)-(49) away from the point (46), whereby creating a triangle (f4)-(46)-(47);
modifying the (4)-(46)-(49) triangle includes marking a point (f4) being equal to a distance of the fold line (47)-(48) away from the point (49) and being equal to a distance of the fold line (46)-(47) away from the point (46), whereby creating a triangle (f4)-(46)-(49);
modifying the (4)-(47)-(48) triangle includes marking a point (f4) being equal to a distance of the fold line (47)-(48) away from the point (47) and being equal to a distance of the fold line (46)-(49) away from the point (48), whereby creating a triangle (f4)-(47)-(48);
modifying the (5)-(37)-(59) triangle includes marking a point (f5) being equal to a distance of the fold line (36)-(38) away from the point (37) and being equal to a distance of the fold line (35)-(38) away from the point (59), whereby creating a triangle (f5)-(37)-(59);
modifying the (3)-(36)-(38) triangle includes marking a point (f5) being equal to a distance of the fold line (37)-(59) away from the point (36) and being equal to a distance of the fold line (35)-(38) away from the point (38), whereby creating a triangle (f5)-(36)-(38);
modifying the (3)-(35)-(38) triangle includes marking a point (f5) being equal to a distance of the fold line (37)-(59) away from the point (35) and being equal to a distance of the fold line (36)-(38) away from the point (38), whereby creating a triangle (f5)-(35)-(38);
modifying the (6)-(27)-(31) triangle includes marking a point (f6) being equal to a distance of the fold line (20)-(33) away from the point (27) and being equal to a distance of the fold line (32)-(34) away from the point (31), whereby creating a triangle (f6)-(27)-(31);
modifying the (8)-(20)-(33) triangle includes marking a point (f6) being equal to a distance of the fold line (32)-(34) away from the point (33) and being equal to a distance of the fold line (27)-(31) away from the point (20), whereby creating a triangle (f6)-(20)-(33);
modifying the (2)-(32)-(34) triangle includes marking a point (f6) being equal to a distance of the fold line (27)-(31) away from the point (32) and being equal to a distance of the fold line (20)-(33) away from the point (34), whereby creating a triangle (f6)-(32)-(34);
modifying the (1)-(39)-(45) triangle includes marking a point (f1) being equal to a distance of the fold line (41)-(42) away from the point (39) and being equal to a distance of the fold line (43)-(44) away from the point (45), whereby creating a triangle (f1)-(39)-(45);
modifying the (11)-(43)-(44) triangle includes marking a point (f1) being equal to a distance of the fold line (39)-(45) away from the point (44) and being equal to a distance of the fold line (41)-(42) away from the point (43), whereby creating a triangle (f1)-(43)-(44);
modifying the (9)-(41)-(42) triangle includes marking a point (f1) being equal to a distance of the fold line (43)-(44) away from the point (42) and being equal to a distance of the fold line (39)-(45) away from the point (41), whereby creating a triangle (f1)-(41)-(42);
modifying the (12)-(18)-(19) triangle includes marking a point (f12) being equal to a distance of the fold line (15)-(16) away from the point (19) and being equal to a distance of the fold line (16)-(17) away from the point (18), whereby creating a triangle (f12)-(18)-(19);
modifying the (14)-(16)-(17) triangle includes marking a point (f12) being equal to a distance of the fold line (18)-(19) away from the point (17) and being equal to a distance of the fold line (15)-(16) away from the point (16), whereby creating a triangle (f12)-(16)-(17);
modifying the (14)-(15)-(16) triangle includes marking a point (f12) being equal to a distance of the fold line (16)-(17) away from the point (16) and being equal to a distance of the fold line (18)-(19) away from the point (15), whereby creating a triangle (f12)-(15)-(16);

modifying the (13)-(55)-(57) triangle includes marking a point (f13) being equal to a distance of the fold line (56)-(58) away from the point (57) and being equal to a distance of the fold line (55)-(57) away from the point (55), whereby creating a triangle (f13)-(55)-(57);

modifying the (13)-(55)-(56) triangle includes marking a point (f13) being equal to a distance of the fold line (55)-(57) away from the point (55) and being equal to a distance of the fold line (56)-(58) away from the point (56), whereby creating a triangle (f13)-(55)-(56);

modifying the (13)-(56)-(58) triangle includes marking a point (f13) being equal to a distance of the fold line (55)-(57) away from the point (58) and being equal to a distance of the fold line (55)-(56) away from the point (56), whereby creating a triangle (f13)-(56)-(58);

modifying the (10)-(51)-(53) triangle includes marking a point (f10) being equal to a distance of the fold line (52)-(54) away from the point (53) and being equal to a distance of the fold line (51)-(52) away from the point (51), whereby creating a triangle (f10)-(51)-(53);

modifying the (10)-(52)-(54) triangle includes marking a point (f10) being equal to a distance of the fold line (51)-(53) away from the point (54) and being equal to a distance of the fold line (51)-(52) away from the point (52), whereby creating a triangle (f10)-(52)-(54); and modifying the (10)-(51)-(52) triangle includes marking a point (f10) being equal to a distance of the fold line (51)-(53) away from the point (51) and being equal to a distance of the fold line (52)-(54) away from the point (52), whereby creating a triangle (f10)-(51)-(52).

4. The method as in claim 3, wherein:

(Y)=0.8;
$(Z_1)=(Z_2)=0.53$;
$(Z_3)=(Z_4)=(Z_5)=(Z_6)=0.6$;
$(Z_7)=(Z_8)=(Z_9)=(Z_{11})=(Z_{12})=(Z_{13})=(Z_{14})=(Z_{15})=0$;
$(Z_{16})=(Z_{17})=(Z_{18})=(Z_{19})=(Z_{20})=(Z_{21})=(Z_{22})=(Z_{23})=(Z_{24})=(Z_{25})=0$;
D=80 degrees;

a point (25) is marked along the fold line (24)-(28) at a distance of 0.6(X) from the point (24);

a point (26) is marked along the line (5)-(6) at a distance of 0.86(X) from the point (5);

the point (25) is connected to the point (26), whereby creating a fold line (25)-(26);

a point (22) is marked along the fold line (23)-(29) at the distance of 0.6(X) from the point (23);

a point (21) is marked along the line (8)-(9) at the distance of 0.86(X) from the point (9);

the point (21) is connected to the point (22), whereby creating a fold line (21)-(22);

a point (50) is marked at a midpoint of the fold line (1)-(3);

the point (2) is connected to the point (50), whereby creating a line (2)-(50) which is perpendicular to the fold line (1)-(3);

a point (2f) is marked along the line (2)-(50), the point (2f) being the distance of 0.86(X) from the point (1) and the distance of 0.86(X) from the point (3);

a new triangle, (1)-(2f)-(3), is created with the points (1), (2f), and (3);

the triangle (12)-(18)-(19) is modified to form the triangle (f12)-(18)-(19); and the polyhedron nets correspond to a three dimensional polyhedra seen in Melencolia I by Albrecht Dürer.

5. A method of producing a three dimensional polyhedra, the method comprising the steps of:

providing a flat piece of foldable material;

defining an orthogonal coordinate system on the material, the coordinate system having a horizontal axis denoted (a), a vertical axis denoted (β), and an origin denoted (1);

selecting a value for a distance (X) that is greater than zero;

selecting a value for a constant (Y) equal to 0.8;

allowing truncating constants $(Z_1)$ and $(Z_2)$ to equal 0.53;

allowing truncating constants $(Z_3)$, $(Z_4)$, $(Z_5)$, and $(Z_6)$ to equal 0.6;

allowing truncating constants $(Z_7)$, $(Z_8)$, $(Z_9)$, $(Z_{11})$, $(Z_{12})$, $(Z_{13})$, $(Z_{14})$, $(Z_{15})$, $(Z_{16})$, $(Z_{17})$, $(Z_{18})$, $(Z_{19})$, $(Z_{20})$, $(Z_{21})$, $(Z_{22})$, $(Z_{23})$, $(Z_{24})$, and $(Z_{25})$ to equal zero;

selecting a value for an angle (D) equal to 80 degrees;

drawing a line along (a) from the origin (1) to a new point (2) that is the distance (X) from the origin (1), whereby forming a line (1)-(2);

continuing the line from the point (2) at an angle of (180−D) degrees from (α) to a new point (3) that is the distance (X) from the point (2), whereby forming a line (2)-(3);

continuing the line from the point (3) at the angle of (D) degrees from (α) to a new point (4) that is the distance (XY) from the point (3), whereby forming a line (3)-(4);

continuing the line from the point (4) at an angle of (−[180−2D]) degrees from (α) to new point (5) that is the distance (XY) from the point (4), whereby forming a line (4)-(5);

continuing the line from the point (5) at an angle of (D) degrees from (α) to a new point (6) that is the distance (X) from the point (5), whereby forming a line (5)-(6);

continuing the line from the point (6) at an angle of (2D) degrees from (α) a new point (7) that is the distance (XY) from the point (6), whereby forming a line (6)-(7);

continuing the line from the point (7) at an angle of (180−D) degrees from (α) to a new point (8) that is the distance (XY) from the point (7), whereby forming a line (7)-(8);

continuing the line from the point (8) at an angle of 180 degrees from (α) to a new point (9) that is the distance (X) from the point (8), whereby forming a line (8)-(9);

continuing the line from the point (9) at an angle of (−D) degrees from (α) to a new point (10) that is the distance (XY) from the point (9), whereby forming a line (9)-(10);

continuing the line from the point (10) at an angle of 180 degrees from (α) to a new point (11) that is the distance (XY) from the point (10), whereby forming a line (10)-(11);

continuing the line from the point (11) at an angle of (−[180−D]) degrees from (α) to a new point (12) that is the distance (X) from the point (11), whereby forming a line (11)-(12);

continuing the line from the point (12) at an angle of 0 degrees from (α) to a new point (13) that is the distance (XY) from the point (12), whereby forming a line (12)-(13);

continuing the line from the point (13) at an angle of (−[180−D]) degrees from (α) to a new point (14) that is the distance (XY) from the point (13), whereby forming a line (13)-(14);

continuing the line from the point (14) at an angle of (−D) degrees from (α) to the origin (1) that is the distance (X) from the point (14), whereby forming a line (14)-(1);

connecting the point (14) to the point (3), whereby forming a fold line (3)-(14);

connecting the point (13) to the point (4), whereby forming a fold line (4)-(13);

connecting the point (13) to the point (10), whereby forming a fold line (10)-(13);

connecting the point (10) to the point (7), whereby forming a fold line (7)-(10);

connecting the point (4) to the point (7), whereby forming a fold line (4)-(7);

marking a point (15) along line (14)-(1), the point (15) being a distance ($Z_1X$) from the point (14);

marking a point (19) along line (11)-(12), the point (19) being the distance ($Z_1X$) from the point (12);

marking a point (16) along the fold line (3)-(14), the point (16) being a distance ($Z_2X$) from the point (14);

marking a point (17) along the line (13)-(14), the point (17) being a distance ($Z_3XY$) from the point (14);

marking a point (18) along the line (12)-(13), the point (18) being the distance ($Z_3XY$) from the point (12);

marking a point (23) along the fold line (7)-(10), the point (23) being a distance ($Z_4X$) from the point (7);

marking a point (24) along the fold line (4)-(7), the point (24) being a distance ($Z_5X$) from the point (7);

marking a point (28) along the line (6)-(7), the point (28) being a distance ($Z_6XY$) from the point (7);

marking a point (29) along the line (7)-(8), the point (29) being the distance ($Z_6XY$) from the point (7);

connecting the point (15) to the point (16), whereby forming a fold line (15)-(16) and a triangle (14)-(15)-(16);

connecting the point (16) to the point (17), whereby forming a fold line (16)-(17) and a triangle (14)-(16)-(17);

connecting the point (18) to the point (19), whereby forming a fold line (18)-(19) and a triangle (12)-(18)-(19);

connecting the point (23) to the point (29), whereby forming a fold line (23)-(29) and a triangle (7)-(23)-(29);

connecting the point (23) to the point (24), whereby forming a fold line (23)-(24) and a triangle (7)-(23)-(24);

connecting the point (24) to the point (28), whereby forming a fold line (24)-(28) and a triangle (7)-(24)-(28);

verifying that the fold line (24)-(28) has a distance of $\sqrt{[(Z_6XY)^2+(Z_5X)^2-2(Z_5Z_6X^2Y\cos(D))]}$;

verifying that the fold line (23)-(29) has a distance of $\sqrt{[(Z_6XY)^2+(Z_4X)^2-2(Z_4Z_6X^2Y\cos(D))]}$;

verifying that the fold line (23)-(24) has a distance of $\sqrt{[(Z_5X)^2+(Z_4X)^2-2(Z_4Z_5X^2\cos(D))]}$;

verifying that the fold line (15)-(16) has a distance of $\sqrt{[(Z_1X)^2+(Z_2X)^2-2(Z_1Z_2X^2\cos(D))]}$;

verifying that the fold line (16)-(17) has a distance of $\sqrt{[(Z_3XY)^2+(Z_2X)^2-2(Z_2Z_3X^2Y\cos(D))]}$;

verifying that the fold line (18)-(19) has a distance of $\sqrt{[(Z_1X)^2+(Z_3XY)^2-2(Z_1Z_3X^2Y\cos(D))]}$;

marking a point (25) along the fold line (24)-(28) at a distance of 0.6(X) from the point (24);

marking a point (26) along the line (5)-(6) at a distance of 0.86(X) from the point (5);

connecting the point (25) to the point (26), whereby creating a fold line (25)-(26);

marking a point (22) along the fold line (23)-(29) at the distance of 0.6(X) from the point (23);

marking a point (21) along the line (8)-(9) at the distance of 0.86(X) from the point (9);

connecting the point (21) to the point (22), whereby creating a fold line (21)-(22);

marking a point (50) at a midpoint of the fold line (1)-(3);

connecting the point (2) to the point (50), whereby creating a line (2)-(50) which is perpendicular to the fold line (1)-(3);

marking a point (2f) along the line (2)-(50), the point (2f) being the distance of 0.86(X) from the point (1) and the distance of 0.86(X) from the point (3);

creating a new triangle, (1)-(2f)-(3), with the points (1), (2f), and (3);

folding the fold line (18)-(19);

separating the polyhedron net from excess foldable material by cutting along the following lines: (1)-(2f)-(3)-(4)-(5)-(6)-(7)-(8)-(9)-(10)-(11)-(19)-(12)-(18)-(13)-(14)-(1);

cutting the line (14)-(16);

folding the polyhedron net along the fold lines (23)-(29), (24)-(28), (21)-(22), (25)-(26), (15)-(16), (16)-(17), (18)-(19), (23)-(24), with all of the fold lines being located on an exterior surface of the polyhedron;

securing the line (25)-(26) to the line (21)-(22);
securing the line (9)-(10) to the line (10)-(11);
securing the line (4)-(5) to the line (3)-(4);
securing the line (13)-(18) to the line (13)-(17);
securing the line (2f)-(3) to the line (5)-(26);
securing the line (1)-(2f) to the line (9)-(21);
securing the line (1)-(15) to the line (11)-(19);
securing the line (7)-(28) to the line (7)-(29);
securing the line (7)-(23) to the line (22)-(23); and
securing the line (7)-(24) to the line (24)-(25).

6. The method as in claim 5, wherein:
the (12)-(18)-(19) triangle is modified by marking a point (f12) being equal to a distance of the fold line (15)-(16) away from the point (19) and being equal to a distance of the fold line (16)-(17) away from the point (18), whereby creating a triangle (f12)-(18)-(19);

the polyhedron net is separated from the excess foldable material by cutting along the following lines: (1)-(2f)-(3)-(4)-(5)-(6)-(7)-(8)-(9)-(10)-(11)-(19)-(f02)-(18)-(13)-(14)-(1);

the line (f12)-(19) is secured to the line (15)-(16); and
the line (f12)-(18) is secured to the line (16)-(17).

7. The method as in claim 5, wherein adjacent edges of the (12)-(18)-(19) triangle, the (14)-(16)-(17) triangle, and the (14)-(15)-(17) triangle are secured together to create a pyramid dome.

8. A method of producing a polyhedron net for a truncated polyhedron, the method comprising the steps of:
providing a flat piece of foldable material;
defining an orthogonal coordinate system on the material, the coordinate system having a horizontal axis, a vertical axis, and an origin;
selecting values for line distances that are greater than zero;
selecting values for angles between lines having the line distances, the angles being between 0 and 180 degrees;
selecting values between zero and one, inclusive, for truncating constants;
drawing the lines, points, and fold lines on the foldable material in accord with the line distances and angles;
defining the value of each truncating constant being less than or equal to one minus another truncating constant on a respective line that will form a single edge of the polyhedron;
marking new points along the lines at distances defined by the truncating constants;
connecting the new points, whereby forming new fold lines and new triangles;
verifying the distances of the new fold lines mathematically; and
modifying the new triangles to define a perimeter.

9. The method of claim 8, further comprising the steps:
cutting around the perimeter;
folding the fold lines; and
securing portions of the perimeter together to form the polyhedron.

10. The method of claim 8, wherein at least one of the new triangles is unaffected by the modifying step.

* * * * *